United States Patent
Kageyama et al.

(10) Patent No.: US 9,994,249 B2
(45) Date of Patent: *Jun. 12, 2018

(54) VEHICLE, AND METHOD FOR STEERING CONTROL OF SAME

(71) Applicant: NISSAN MOTOR CO., LTD., Yokohama-shi, Kanagawa (JP)

(72) Inventors: Yusuke Kageyama, Isehara (JP); Yutaka Mikuriya, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/030,503

(22) Filed: Sep. 18, 2013

(65) Prior Publication Data

US 2014/0014433 A1 Jan. 16, 2014

Related U.S. Application Data

(63) Continuation of application No. 13/989,908, filed as application No. PCT/JP2011/006586 on Nov. 25, 2011.

(30) Foreign Application Priority Data

Nov. 29, 2010 (JP) .................. 2010-265680
Oct. 24, 2011 (JP) .................. 2011-232879

(51) Int. Cl.
*A01B 69/00* (2006.01)
*B62D 5/00* (2006.01)
(Continued)

(52) U.S. Cl.
CPC ............ *B62D 5/001* (2013.01); *B62D 5/046* (2013.01); *B62D 7/18* (2013.01)

(58) Field of Classification Search
USPC ................................ 70/41; 701/41
See application file for complete search history.

(56) References Cited

U.S. PATENT DOCUMENTS 2,979,148 A 4/1961 Bidwell
3,240,285 A 3/1966 Williamson
(Continued)

FOREIGN PATENT DOCUMENTS

DE 1020060 25 558 A1 12/2007
DE 1020070 47 786 A 5/2009
(Continued)

OTHER PUBLICATIONS

Japanese Office Action dated Feb. 12, 2014, 2 pages.
(Continued)

*Primary Examiner* — Hussein Elchanti
(74) *Attorney, Agent, or Firm* — Foley & Lardner LLP

(57) ABSTRACT

Maneuverability and stability of a suspension unit for a vehicle are improved. A vehicle includes: a steer-by-wire system detecting a displacement of a steering wheel and displacing a steering rack steering steerable wheels on a basis of a detection result of the displacement and a suspension unit suspending the steerable wheels, the suspension unit including: wheel hub mechanisms, each wheel hub mechanism supporting a tire wheel on which a tire is attached, and a plurality of link members supporting the wheel hub mechanisms on the vehicle body; and a kingpin axis passing through an upper pivot point of the link members and lower pivot point of the link members being set to pass through a road surface contact area of the tire at a neutral position of the steering wheel.

20 Claims, 22 Drawing Sheets

(51) Int. Cl.
    *B62D 7/18*    (2006.01)
    *B62D 5/04*    (2006.01)

(56) References Cited

U.S. PATENT DOCUMENTS

| | | | |
|---|---|---|---|
| 3,485,506 A | | 12/1969 | Melbar et al. |
| 4,664,412 A | | 5/1987 | Matschinsky |
| 4,842,296 A | | 6/1989 | Kubo |
| 4,878,688 A | | 11/1989 | Kubo |
| 4,951,199 A | * | 8/1990 | Whitehead ............... B62D 7/22 180/446 |
| 5,102,159 A | | 4/1992 | Sato et al. |
| 5,754,966 A | | 5/1998 | Ichikawa et al. |
| 5,941,338 A | * | 8/1999 | Miller et al. ................ 180/421 |
| 6,675,928 B2 | * | 1/2004 | Takai et al. ................. 180/422 |
| 7,222,431 B1 | | 5/2007 | Norton et al. |
| 7,571,033 B2 | | 8/2009 | Fujioka et al. |
| 7,974,752 B2 | | 7/2011 | Yamashita et al. |
| 8,240,422 B2 | * | 8/2012 | Yamasaki ............... B62D 5/001 180/402 |
| 2003/0196849 A1 | * | 10/2003 | Menjak et al. ............. 180/446 |
| 2003/0217885 A1 | * | 11/2003 | Aoki ................. B62D 5/0466 180/446 |
| 2003/0221894 A1 | * | 12/2003 | Guldner ................ B60T 8/1755 180/402 |
| 2004/0016594 A1 | | 1/2004 | Yasui et al. |
| 2004/0046350 A1 | | 3/2004 | Wagner et al. |
| 2004/0148078 A1 | | 7/2004 | Nakano et al. |
| 2006/0006623 A1 | * | 1/2006 | Leclair .................... B62D 7/18 280/93.512 |
| 2006/0070794 A1 | | 4/2006 | Fujita et al. |
| 2007/0284180 A1 | * | 12/2007 | Suehiro et al. ............. 180/444 |
| 2008/0196966 A1 | * | 8/2008 | Maruyama et al. .......... 180/446 |
| 2009/0095562 A1 | | 4/2009 | Yasui et al. |
| 2009/0194965 A1 | | 8/2009 | Boston |
| 2010/0106372 A1 | | 4/2010 | Watanabe et al. |
| 2011/0022270 A1 | * | 1/2011 | Tamaizumi .......... B62D 5/0463 701/41 |
| 2011/0224874 A1 | * | 9/2011 | Pattok et al. .................... 701/41 |
| 2014/0008141 A1 | | 1/2014 | Kageyama et al. |

FOREIGN PATENT DOCUMENTS

| | | |
|---|---|---|
| DE | 102007047 787 A1 | 5/2009 |
| DE | 102007047 788 A1 | 5/2009 |
| DE | 102007047 789-1 | 5/2009 |
| DE | 102007047 790 A1 | 5/2009 |
| DE | 102007047 791 A1 | 5/2009 |
| DE | 102007047 792 A1 | 5/2009 |
| DE | 102008044 103 A1 | 6/2010 |
| EP | 1 864 886 A2 | 12/2007 |
| EP | 2 119 616 A1 | 11/2009 |
| EP | 2 207 690 B1 | 2/2013 |
| JP | 60-151181 A | 8/1985 |
| JP | 63-166610 A | 7/1988 |
| JP | 02-204173 A | 8/1990 |
| JP | 3-57709 A | 3/1991 |
| JP | 04-108083 A | 4/1992 |
| JP | 5-169941 A | 7/1993 |
| JP | 11-129926 A | 5/1999 |
| JP | 3076541 B2 | 6/2000 |
| JP | 2007-038976 A | 2/2007 |
| JP | 2007-118672 A | 5/2007 |
| JP | 2007-237840 A | 9/2007 |
| JP | 2008-018924 A | 1/2008 |
| JP | 2008-265489 A | 11/2008 |
| JP | 2008-265489 A | 11/2008 |
| JP | 2009-090762 A | 4/2009 |
| JP | 2009-248649 A | 10/2009 |
| JP | 2010-047193 A | 3/2010 |
| JP | 2010-058588 A | 3/2010 |
| JP | 2010-058619 A | 3/2010 |
| JP | 2010-126014 A | 6/2010 |
| JP | 4664412 B2 | 1/2011 |
| RU | 2008 104 696 A | 8/2009 |
| WO | WO-2005/091699 A1 | 10/2005 |
| WO | WO-2005/092644 A1 | 10/2005 |
| WO | WO 2005091699 * | 10/2005 |
| WO | WO 2009/062823 A1 | 5/2009 |
| WO | WO-2009/062824 A1 | 5/2009 |
| WO | WO-2009/062825 A1 | 5/2009 |
| WO | WO 2009/113642 A1 | 9/2009 |

OTHER PUBLICATIONS

USPTO Office Action, U.S. Appl. No. 14/005,130, dated Nov. 12, 2014, 18 pages.
Japanese Office Action , dated Sep. 24, 2013, 3 pages.
USPTO Office Action, U.S. Appl. No. 13/989,908, dated Aug. 21, 2014, 23 pages.
Russian Decision on Grant, dated Jul. 31, 2014, 23 pages.
USPTO Office Action, U.S. Appl. No. 14/005,130, dated Mar. 18, 2015, 18 pages.
Chinese Office Action, dated Feb. 28, 2015, 7 pages.
USPTO Office Action, U.S. Appl. No. 13/989,908,dated Jan. 28, 2015, 19 pages.
USPTO Office Action, U.S. Appl. No. 14/030,503, dated May 12, 2015, 18 pp. 1.
USPTO Office Action, U.S. Appl. No. 13/989,908, dated Aug. 19, 2015, 31 pages.
USPTO Office Action, U.S. Appl. No. 14/005,130, dated Aug. 10, 2015, 16 pages.
USPTO Office Action, U.S. Appl. No. 13/989,908, dated Dec. 7, 2015, 40 pages.
USPTO Office Action, U.S. Appl. No. 13/989,908, dated May 12, 2015, 34 pages.
USPTO Notice of Allowance, U.S. Appl. No. 14/005,130, dated Feb. 3, 2017, 10 pages.
USPTO Notice of Allowance, U.S. Appl. No. 13/989,908, dated Jul. 12, 2016, 16 pages.
USPTO Office Action, U.S. Appl. No. 14/005,130 dated Oct. 19, 2016, 10 pages.

* cited by examiner

A VARIATION OF A LOCUS OF A CENTER OF TIRE ROAD SURFACE CONTACT AREA

DISTRIBUTION OF RACK AXIAL FORCE

VEHICLE, AND METHOD FOR STEERING CONTROL OF SAME

CROSS-REFERENCE TO RELATED PATENT APPLICATIONS

This application is a continuation of U.S. application Ser. No. 13/989,908, filed May 28, 2013, which is the National Stage of Application No. PCT/JP2011/006586 filed on Nov. 25, 2011, which is based upon and claims the benefit of priority from the prior Japanese Application No. 2011-232879, filed Oct. 24, 2011 and Japan Priority Application 2010-265680, filed Nov. 29, 2010, the entire contents of all of which are incorporated herein by reference.

TECHNICAL FIELD

The present invention relates to a vehicle and a steering control method of the same which are capable of securing a straightness.

BACKGROUND ART

Conventionally, in a suspension unit for a vehicle, an achievement of a target suspension performance is intended by setting a kingpin axis.

For example, in a technique described in Patent Document 1, links of the suspension unit are arranged to suppress a vehicular forward-or-backward movement of upper and lower pivot points constituting the kingpin at a time of a steering of the vehicle to improve maneuverability and stability.

PRE-PUBLISHED DOCUMENT

Patent Document

Patent document 1: Japanese Patent Application First Publication (tokkai) No. 2010-126014.

DISCLOSURE OF THE INVENTION

Task to be Solved by the Invention

However, in a case where a steering operation is carried out during a traveling of the vehicle, a lateral force in accordance with a traveling speed is inputted to a road surface contact point of a vehicle tire. In the technique described in Patent Document 1, an influence caused by the lateral force is not considered. Hence, there is a room of improvement in a reduction in a moment generated around the kingpin axis at the time of the steering. That is to say, a conventional vehicular suspension unit has a room for improvement to attempt to improve the maneuverability and stability of the vehicle.

A task of the present invention is to improve the maneuverability and stability of the suspension unit in the vehicle.

Means for Solving the Task

In order to solve the above-described task, one embodiment of an automotive vehicle according to the present invention comprises: a steering control apparatus that steers steerable wheels; and a suspension unit suspending the steerable wheels on a vehicle body, the suspension unit being installed to set a kingpin axis to pass within a road surface contact area of a tire at a neutral position of a steering wheel and the above-described steering control apparatus actuating an actuator to generate a restoring force for a self-aligning on the steerable wheels to steer the steerable wheels in order to secure the straightness of the vehicle.

Effect of the Invention

According to the present invention, a moment around the kingpin axis can furthermore be made smaller so that the steering with a smaller rack axial force can be carried out. Therefore, for example, a direction of the road wheels can be controlled with a smaller force. Then, the straightness of the vehicle can be secured by means of the steering control apparatus.

Hence, the maneuverability and stability of the vehicle can be improved.

DESCRIPTION OF THE EMBODIMENTS

Hereinafter, preferred embodiments of an automotive vehicle to which the present invention is applicable will be described with reference to the attached drawings.
(First Embodiment)
(Structure)

Figure 1:
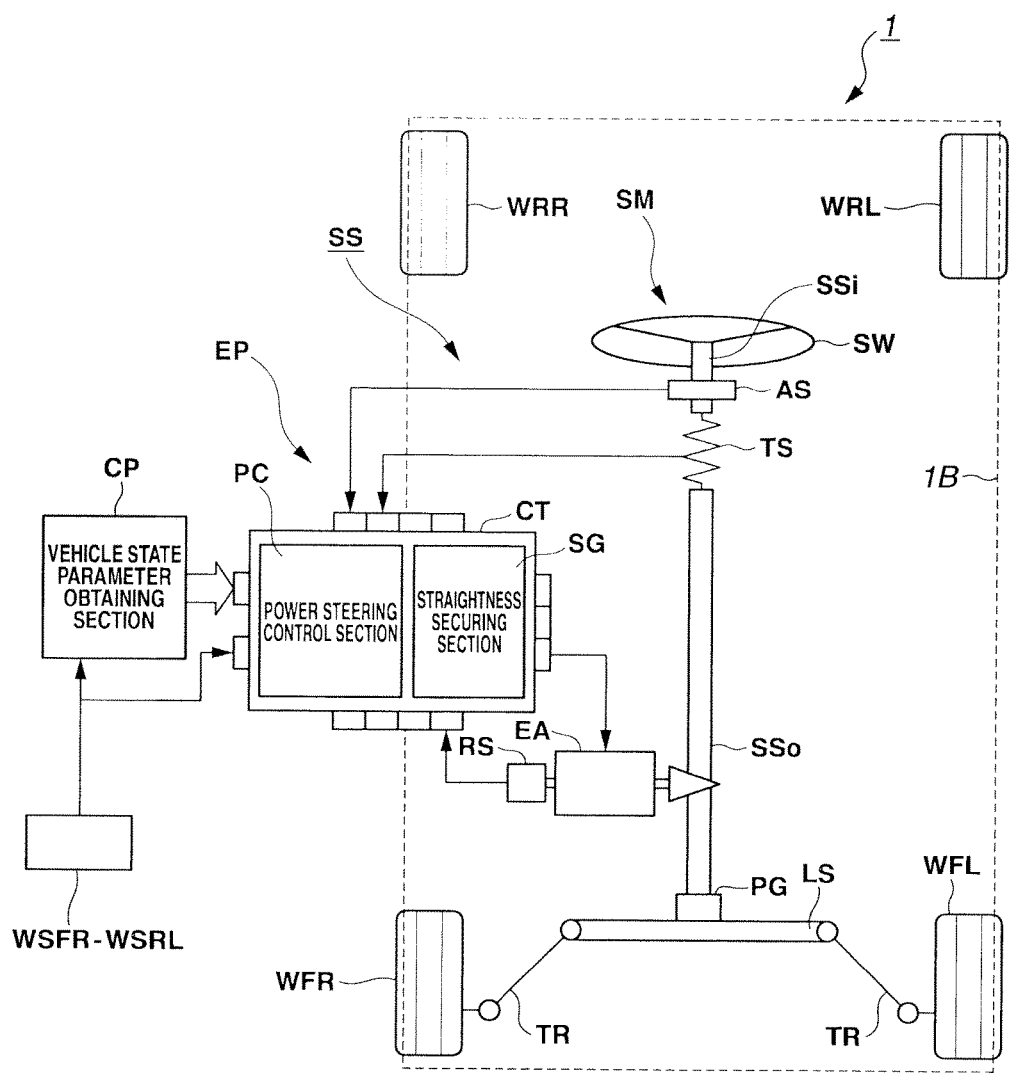
FIG. 1 is a rough configuration view representing a structure of an automotive vehicle 1 in a first preferred embodiment.

FIG. 1 is a rough configuration view representing a structure of automotive vehicle C related to a first preferred embodiment which is a principal structure of the present invention.

In FIG. 1, automotive vehicle 1 includes a vehicle body 1A. This vehicle body 1A is provided with a suspension unit 1B supporting road wheels WFR, WFL, WRR, and WRL and a steering system SS which steers front road wheel side steerable wheels WFR and WFL. Steering system SS includes a steering mechanism SM and an electrically driven power steering apparatus EP providing a steering assistance force to this steering mechanism.

Steering mechanism SM includes: an input side steering axle SSi; an output side steering axle SSo; a steering wheel SW, a pinion gear PG; a rack axle LS; and tie rods TR, TR.

Steering wheel SW is attached onto a tip of a vehicle rear side of input side steering axle SSi. Then, input side steering axle SSi and output side steering axle SSo are rotatably supported on vehicle body 1A and interlinked with each other via a torsion bar (not shown).

Pinion gear PG is linked to a vehicle front end side of output side steering axle SSo and is meshed with a rack gear formed on rack axle LS to constitute a pinion-and-rack mechanism. This pinion-and-rack mechanism converts a rotary motion of steering wheel SW into a linear motion in a vehicle width direction. Tie rods TR, TR are linked between both ends of rack axle LS and steerable wheels WFR, WFL. These tie rods TR are linked between both ends of rack axle LS and knuckle arms of road wheels WFR, WFL via ball joints, respectively.

On the other hand, electrically driven power steering apparatus EP includes a steering angle sensor AS detecting a steering angle of steering wheel SW attached onto input side steering axle SSi; a steering torque sensor TS detecting a steering torque on a basis of a rotation angle difference between input side steering axle SSi and output side steering axle SSo; an electrically driven actuator WA which transmits a steering control force for output side steering axle SSo; and a rotational angle sensor RS detecting a rotational angle of electrically driven actuator EA. It should be noted that this electrically driven actuator EA is constituted by an electrically driven motor and a gear integrally rotated with a motor shaft of the motor is meshed with a gear formed on a part of output side steering axle SSo to rotate output side steering axle SSo.

In addition, electrically driven power steering apparatus EP includes: a steering control apparatus CT which drivingly controls electrically driven actuator EA; road wheel speed sensors WSFR, WSFL, WSRR, WSRL detecting road wheel speeds of respective road wheels WFR, WFL, WRR, WRL; and a vehicle state parameter obtaining section CP.

Vehicle state parameter obtaining section CP obtains a vehicle speed on a basis of pulse signals representing rotational speeds of the road wheels outputted from road wheel speed sensors WFR, WFL, WRR, WRL.

In addition, vehicle state parameter obtaining section CP obtains a slip rate (slippage) of each road wheel on a basis of the vehicle speed and the rotational speed of each road wheel. Furthermore, vehicle state parameter obtaining section CP outputs each parameter obtained thereat to control apparatus CS.

Steering control apparatus CT inputs a steering angle θs detected by steering angle sensor 4, a steering torque Ts detected by steering torque sensor TS, and an actuator rotational angle θa detected by rotational angle sensor RS.

This steering control apparatus CT includes; a power steering control section PC and a straightness securing section SG. Power steering control section PC calculates a target auxiliary steering torque on a basis of steering torque Ts and vehicle speed V, calculates a drive current driving electrically driven actuator EA on a basis of the calculated target steering auxiliary torque, and drivingly controls electrically driven actuator EA supplying this drive current to electrically powered actuator EA.

Straightness securing section SG performs a straightness complement control to complement the straightness of suspension unit 1B as will be described later. Each of road wheels WFR, WFL, WRR, WRL is constituted by a tire attached onto a wheel hub mechanism WH and is installed on vehicle body 1A via suspension unit 1B. On front road wheels which are steerable wheels WFL, WFR, the knuckle arms are swung by means of tie rods 15 so that a direction of road wheels WFR, WFL with respect to vehicle body 1A is changed.

Figure 2:
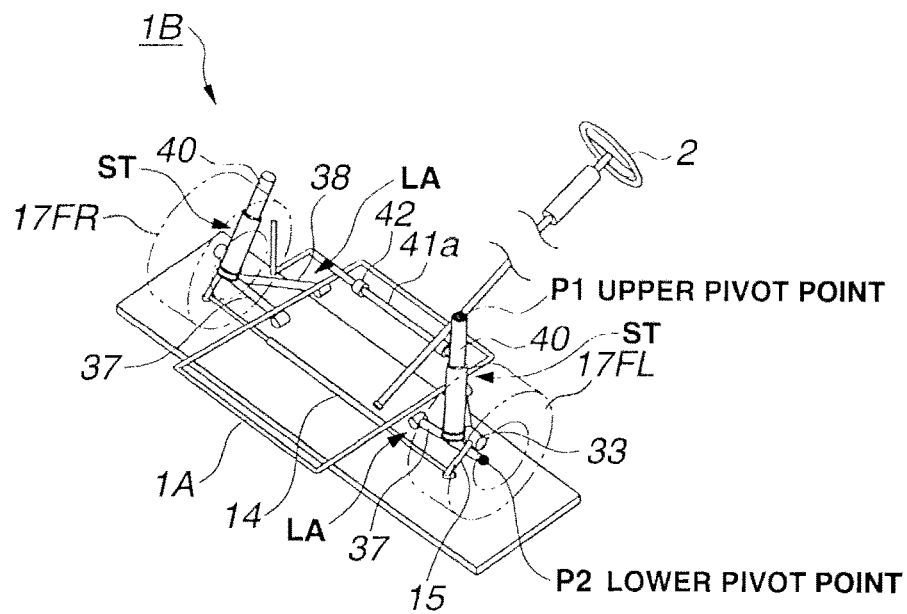
FIG. 2 is a perspective view diagrammatically representing a structure of a suspension unit 1B.
Figure 3:
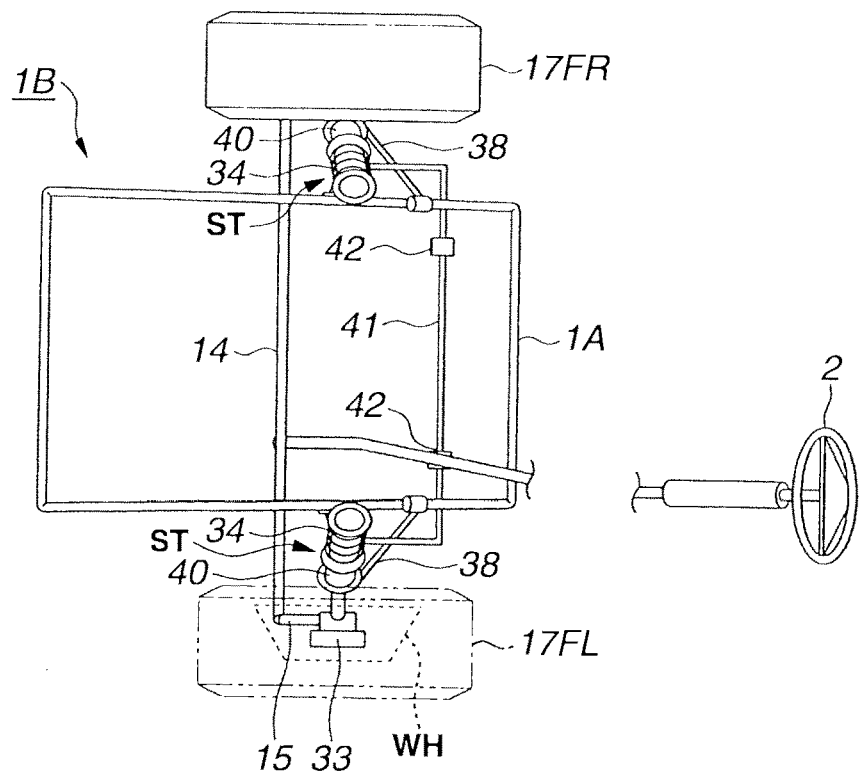
FIG. 3 is a plan view diagrammatically representing a structure of suspension unit 1B.

FIG. 2 is a perspective view diagrammatically representing a structure of suspension unit 1B related to the first embodiment. FIG. 3 is a plan view diagrammatically representing a structure of suspension unit 1B in FIG. 2. FIGS.

4(*a*) and 4(*b*) are partial front view and partial side view diagrammatically representing the structure of suspension unit 1B in FIG. 2.

Figure 4A:
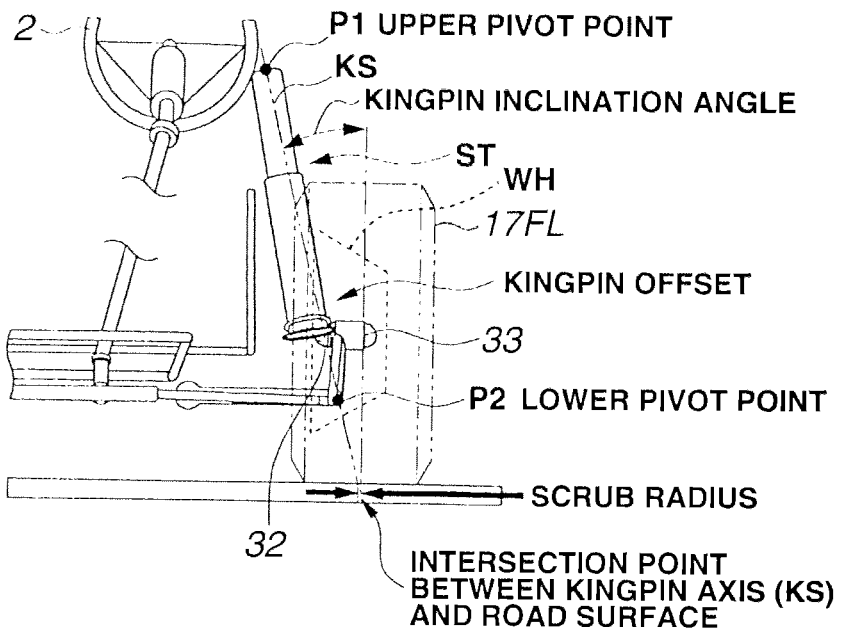
FIGS. 4(a) and 4(b) are a partially front view and a partially side view diagrammatically representing the structure of suspension unit 1B.
Figure 4B:
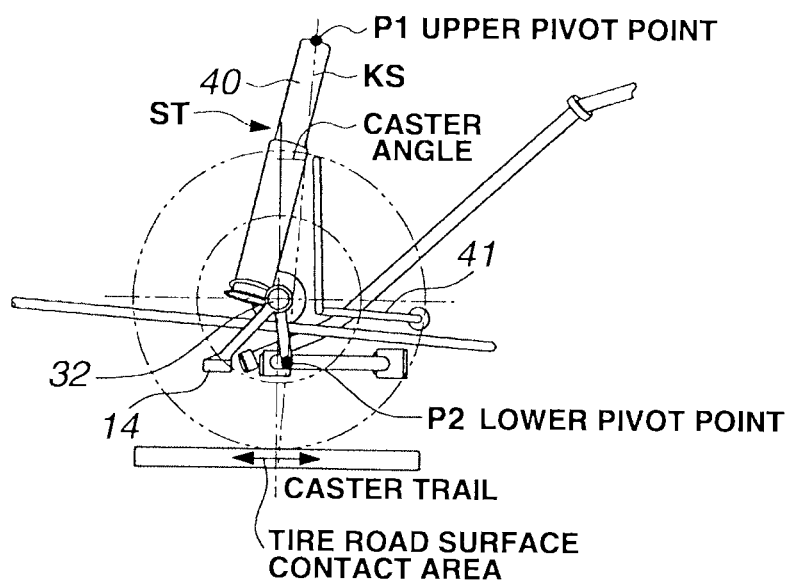

As shown in FIGS. 2 through 4(*b*), suspension unit 1B suspends road wheels 17FR, 17FL attached onto wheel hub mechanisms WH and includes an axle carrier 33 having an axle 32 rotatably supporting each of road wheels 17FR, 17FL; a plurality of link members disposed in the vehicle body width direction from a supporting section of suspension unit 1B at the vehicle body side and linked to axle carrier 33 of each of front road wheel 17FR, 17FL; and spring members 34, 34 constituted by coil springs and so forth.

The plurality of link members are constituted by: first links (first link members) 37, 37; second links (second link members) 38, 38, both of the first and second links being lower link members; tie rods (tie rod members) 15, 15; and struts (spring members 34, 34 and shock absorbers 40, 40). In this embodiment, suspension unit 1B is a suspension of a strut type, an upper end of each of the struts which is united together with corresponding spring member 34 and each shock absorber 40 being linked to the supporting section of the vehicle body side located at a further upper side than axles 32, 32 (hereinafter, the upper end of each strut is appropriately referred to as an upper pivot point). First links 37, 37 and second links 38, 38 which are respectively the lower arms are linked to the lower ends of axle carriers 33, 33 and the supporting sections of the vehicle body side located at a lower position than axles 32, 32. Each of these lower arms is provided with an A arm configuration such as to be supported at the vehicle body side at two locations and linked to corresponding axle 32 at a single location (hereinafter, a linkage section between each of the low arms and corresponding one of axle carriers 33, 33 is often appropriately referred to as a lower pivot point).

Each of tie rods 15, 15 is positioned at a lower side of corresponding one of axles 32, 32 and serves to link between rack axle 14 and corresponding one of axle carriers 33, 33 and rack axle 14 generates an axial force for a steering purpose with a rotational force (a steering force) transmitted from steering wheel 2. Hence, tie rods 15, 15 serve to apply the axial force in the vehicle width direction to axle carriers 33, 33 in accordance with the rotation of steering wheel 2 so that road wheels 17FR, 17FL are steered via axle carriers 33, 33.

According to the present invention, in a state in which steering wheel 2 is in a neutral position, namely, in a state in which steerable wheels 17FL, 17FR are in a straight running state, a kingpin axis KS connecting upper pivot point P1 of suspension unit 1B and lower pivot point P2 thereof is set in such a way that a road surface contact point of kingpin axis KS is placed within a tire road surface contact area (a contact patch of the tire) and in such a way that a caster trail is placed within the tire road contact area. More specifically, in suspension unit 1B in this embodiment, kingpin axis KS is set to make a caster angle near to zero and to approach the caster trail to zero. Thus, a tire torsional torque at a time of a steering operation can be reduced and a moment around kingpin axis KS can further be made smaller. In addition, a scrub radius is set as a positive scrub equal to or larger than zero. Thus, the caster trail is varied corresponding to the scrub radius and the straightness can be secured.

Hereinafter, a suspension geometry in suspension unit 1B will be discussed in details.

(Analysis of the Rack Axial Force Components)

Figure 5:
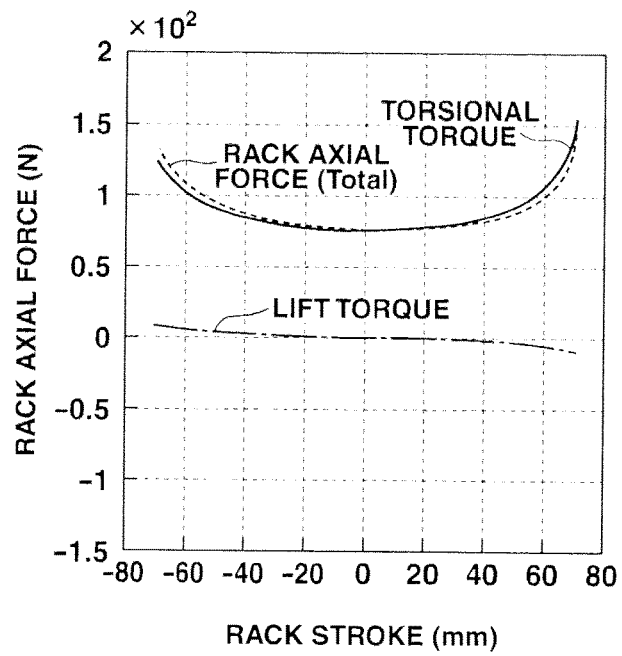
FIG. 5 is a graph representing a relationship between a rack stroke and a rack axial force at a time of a steering operation.

FIG. 5 shows a graph representing a relationship between a rack stroke and rack axial force at a time of the steering operation.

As shown in FIG. 5, the rack axial force components include mainly a tire torsional torque and a road wheel lift torque and the tire torsional torque is predominant from among these torques.

Hence, if the tire torsional torque is made small, the rack axial force can be reduced.

(Minimization of the Tire Torsional Torque)

Figure 6:
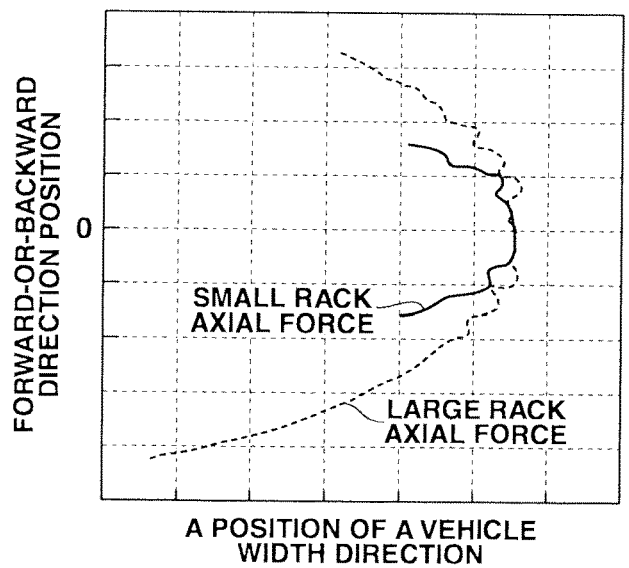
FIG. 6 is a graph representing a locus of a road surface contact area of a tire of the vehicle at the time of the steering operation.

FIG. 6 shows a locus of a tire road surface contact area center at the time of the steering operation.

In FIG. 6, a case where a movement of the tire road surface contact area center at the time of the steering operation is large and a case where the movement of the tire road surface contact area center at the time of the steering operation is small are integrally shown.

As the result of analysis of the above-described rack axial force components, it is effective to minimize the tire torsional torque at the time of the steering operation in order to reduce the rack axial force.

That is to say, in order to minimize the tire torsional torque at the time of the steering operation, as shown in FIG. 6, the variation in the locus of the tire road surface contact area center at the time of the steering operation may be set to be small.

That is to say, if the tire road surface contact area center and the kingpin axis road surface contact point are made coincident with each other, the tire torsional torque can be minimized.

Specifically, as will be described later, it is effective to provide the positive scrub having 0 mm of caster trail and the scrub radius equal to or larger than 0 mm.

(Influence of Kingpin Inclination Angle)

Figure 7:
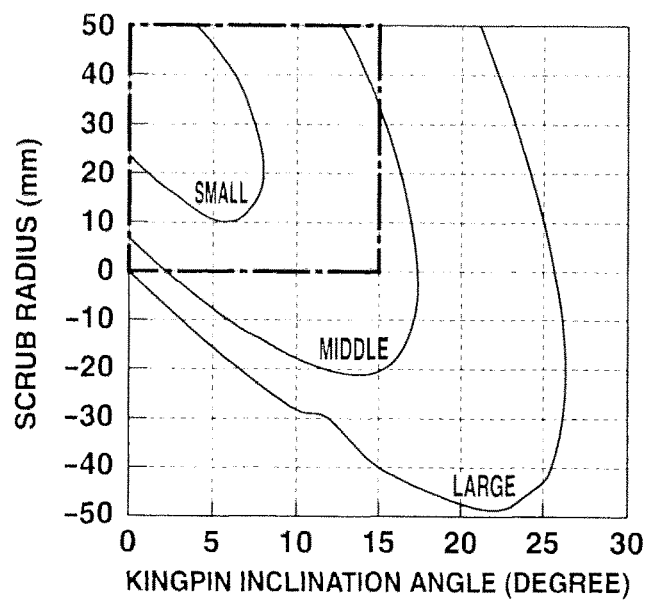
FIG. 7 is an isoline map view representing one example of a distribution of the rack axial force in a coordinate system with a kingpin inclination angle and a scrub radius as a lateral axis of the coordinate system and a longitudinal axis thereof.

FIG. 7 is an isoline map representing one example of a distribution of the rack axial force in a coordinate system with the kingpin inclination angle and the scrub radius as axe in a case where the rack axial force is any one of three cases of large, middle, and small.

As the kingpin inclination angle becomes larger, with respect to the same tire torsional torque, its rotational moment of the kingpin axis becomes larger and the rack axial force becomes larger. Hence, as the king inclination angle, it is desirable to set the kingpin inclination angle to be smaller than a constant value. However, from the relationship of the scrub radius, if, for example, the kingpin inclination angle is set to be equal to or smaller than 15 degrees, the rack axial force can be set to be made small to a desirable level.

It should be noted that a region enclosed by a dot-and-dash line (boundary line) in FIG. 7 indicates a region in which the kingpin inclination angle is smaller than 15 degrees through which the lateral force can be estimated as a value exceeding a limit of friction in a limitation area of a turning and the scrub radius is equal to or larger than 0 mm from the viewpoint of the tire torsional torque.

In this embodiment, this region (a direction in which the kingpin inclination angle is decreased from 15 degrees in the lateral axis of FIG. 7 and a direction in which the scrub radius is increased from zero in the longitudinal axis of FIG. 7) is assumed to be a region more suitable for the setting of the kingpin inclination angle and the scrub radius.

Specifically, in a case where the scrub radius and the kingpin inclination angle are determined, for example, the isoline representing the distribution of the rack axial force shown in FIG. 7 is approximated as an n-order curved line (n denotes an integer equal to or larger than 2) and, from an inside of the region enclosed by the above-described dot-and-dash line, values of the kingpin inclination angle and the scrub radius defined according to a position of a point of inflection (or a peak value) of the n-order curved line can be adopted.

(An Example of the Minimization of the Rack Axial Force)

Figure 8:
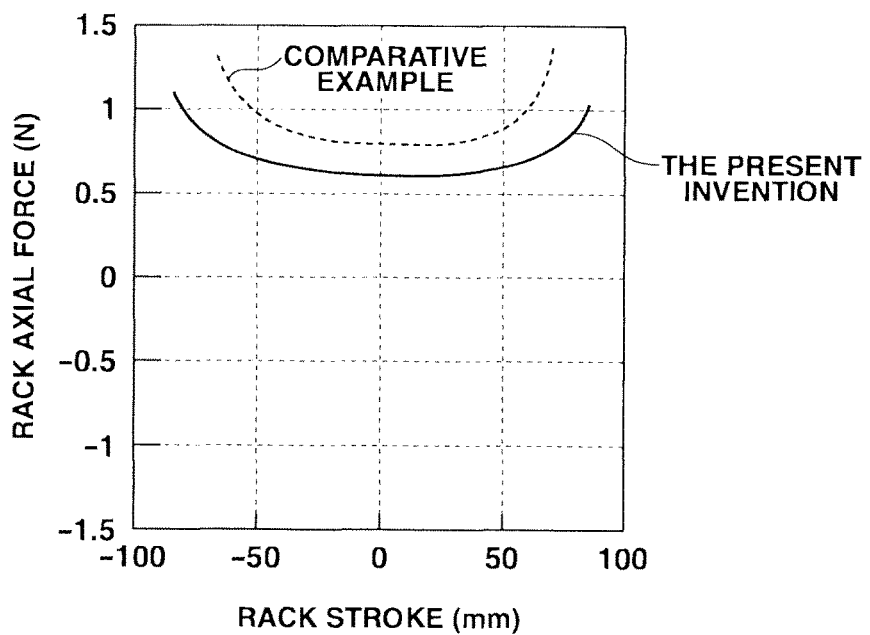
FIG. 8 is a graph representing a result of analysis of the rack axial force in suspension unit 1B.

FIG. 8 is a graph representing a result of analysis of the rack axial force in suspension unit 1B in the preferred embodiment.

A solid line shown in FIG. 8 denotes the rack axial force characteristic in the suspension structure shown in FIGS. 2 through 4(b) when the caster angle is set to 0 degree, the caster trail is set to 0 mm, and the scrub radius is set to +10 mm.

It should be noted that, in FIG. 8, a comparative example (a broken line) when the settings related to the kingpin axis are carried out to conform to the structure in which the steering system of a steer-by-wire type is not installed although the suspension structure of the same type as suspension unit 1B is shown together with the present invention.

As shown in FIG. 8, the rack axial force can be reduced by approximately 30% with respect to the comparative example when the settings are carried out in accordance with the result of discussion described above.

Figure 9:
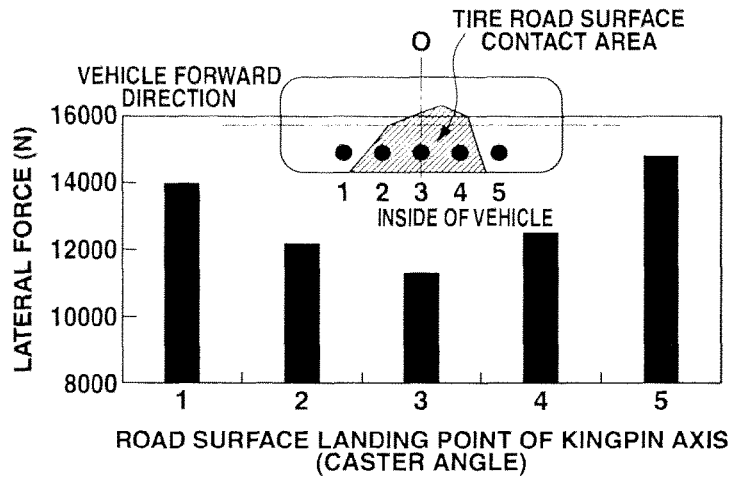
FIG. 9 is a graph representing a relationship between a landing point of a road surface of a kingpin axis and a lateral force.

As described above, since the caster angle of 0 degree can improve a suspension stiffness, the caster trail of 0 mm means that a road surface landing spot (grounding point) of kingpin axis KS is made coincident with a tire contact road surface (grounding) center point (force application point) O in a tire road surface contact (grounding) area, as denoted by a sign 3 in FIG. 9 which represents a relationship between the road surface landing spot (grounding point) of kingpin axis KS and the lateral force and this can improve a large lateral force reduction effect. It should be noted that, even though the landing spot of kingpin axis KS within the tire contact area including tire grounding (contact) center point is sign 2 or sign 4, the lateral force can be reduced as compared with a case where a position of the contact point (grounding point) of kingpin axis KS is deviated from the tire contact area in a vehicle forward-or-backward direction as denoted by a sign 1 or a sign 5. Specially, the lateral force in a case where the contact point of kingpin axis KS is placed at a more vehicle forward side than the tire contact (grounding) center point (force application point) is suppressed to be smaller than a case where the grounding point of kingpin axis KS is placed at a more vehicle backward side than the tire contact (grounding) center point (point of application of force).

(Securing the Straightness According to the Positive Scrub)

Figure 10:
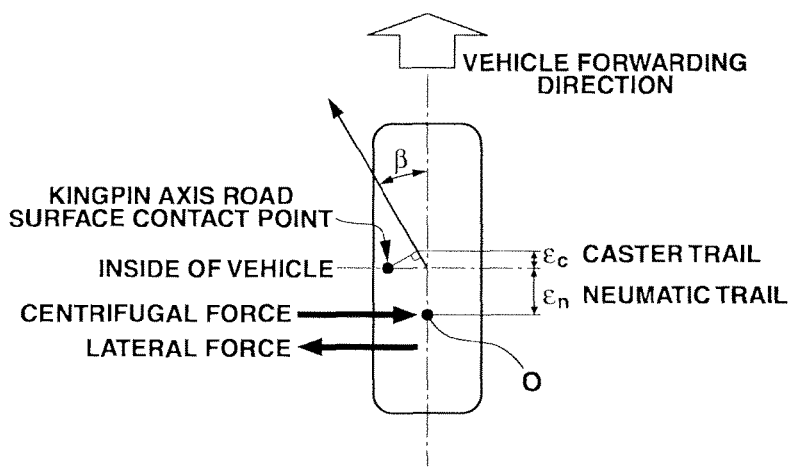
FIG. 10 is a conceptual view for explaining a self-aligning torque in a case of a positive scrub.

FIG. 10 shows a conceptual view for explaining a self-aligning torque in a case where the positive scrub is set.

In FIG. 10, when a centrifugal force directed toward an outside of a turning of the vehicle body is acted upon tire road surface contact (grounding) center point (point of application of force) O during the steering operation, the lateral force directed toward an axis of turning against this centrifugal force is generated. It should be noted that $\beta$ denotes a side slip angle.

As shown in FIG. 10, a restoring force (a self-aligning torque) acted upon the tire becomes larger in proportion to a sum of the caster trail and a pneumatic trail.

It should be noted that, in a case of the positive scrub, a distance $\varepsilon c$ (refer to FIG. 10) from a tire wheel center, defined according to a position of a foot of a perpendicular line lowered to a straight line in a side slip angle $\beta$ direction of the tire passing through the center of the tire, can be assumed to be the caster trail.

Therefore, as the scrub radius of the positive scrub becomes larger, the restoring force acted upon the tire during the steering operation becomes larger. In this embodiment, the influence of approaching the caster angle to zero on the straightness can be reduced by means of the setting of the positive scrub.

(Example of Suspension Design)

The present Applicants have confirmed that, in a case where, in the structure of suspension unit 1B shown in FIGS. 2 through 4(b), in accordance with the above-described result of discussion, the kingpin inclination angle is 13.8 degrees, the caster trail is 0 mm, the scrub radius is 5.4 mm (positive scrub), the caster angle is 5.2 degrees, a kingpin offset in a height of the wheel center is 86 mm, the rack axial force can be reduced by approximately 30%.

It should be noted that, since, for the design value described above, during a braking of the vehicle, the suspension lower link member is moved toward a vehicle backward direction and, at this time, the kingpin lower end is moved in the same way toward the vehicle backward direction, the caster angle takes a constant backward inclination. In this connection, in a case where the caster angle is equal to or smaller than 0 degree (a case where kingpin axis KS is in a forward inclination state), a rack moment, at a time of steering-and-braking operations, becomes large so that the rack axial force is increased. Hence, the position of kingpin axis KS is prescribed as described above.

That is to say, the kingpin lower pivot point (including a virtual pivot) is located at a position behind the wheel center and the kingpin upper pivot point (including the virtual pivot) is located at a position forward the lower pivot point.

Next, a specific structure of steering control apparatus CT will be described with reference to FIGS. 11 through 13(b).

Figure 11:
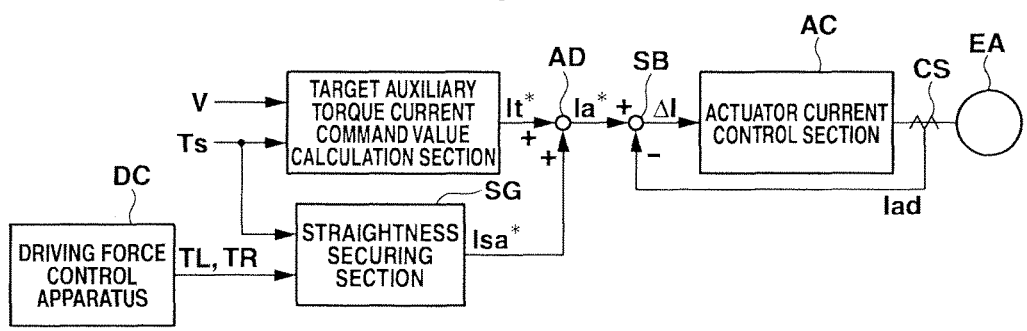
FIG. 11 is a block diagram representing a specific structure of the steering control apparatus in FIG. 1.

Power steering control section PC, as shown in FIG. 11, includes: a target auxiliary torque current command value calculation section TO; and an actuator current control section AC. Target auxiliary torque current command value calculation section TO refers to a control map based on steering torque Ts detected by steering torque sensor TS and vehicle speed V to calculate a target auxiliary torque current command value It* which accords with steering torque Ts and outputs calculated target auxiliary torque current command value It* to an adder AD. This adder AD adds a straightness securing purpose current command value Isa* as will be described later to target auxiliary torque current command value It* to calculate a target actuator current Ia*, calculated target actuator current Ia* being outputted to a subtracter SB. An actuator current Iad detected by an actuator current sensor CS and which is supplied to electrically driven actuator EA is fed back to this subtracter SB. Hence, subtracter SB calculates a current deviation $\Delta I$ by subtracting actuator current Iad from target actuator current command value Ia*.

Actuator current control section AC, for example, performs a PID (Proportional-Integration-Differential) control for current deviation $\Delta I$ inputted from subtracter SB to calculate actuator current Iad and outputs calculated actuator current Iad to electrically driven actuator EA.

On the other hand, straightness securing section SG calculates self-aligning torque Tsa and calculates a straightness securing purpose current command value Isa* which secures the straightness of suspension unit 1B on a basis of calculated self-aligning torque Tsa. A specific structure of this straightness securing section SG is as follows: That is to say, driving forces of left and right road wheels TR and TL outputted from driving force control section DC which distributes and controls right and left driving wheel driving forces are inputted to straightness securing section SG and steering torque Ts detected by steering torque sensor ST are inputted thereto to calculate self-aligning torque Tsa on a basis of these inputs. In addition, straightness securing section SG multiplies calculated self-aligning torque Tsa by a predetermined current gain Ki to calculate straightness securing purpose current command value Isa* (=Ki·Tsa).

Figure 12:
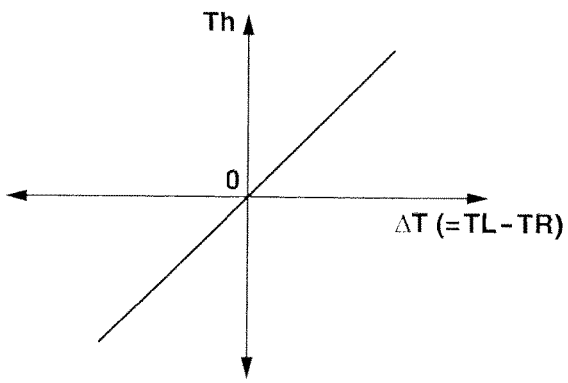
FIG. 12 is a graph representing a generation torque control map for estimating the self-aligning torque.

It should be noted that the calculation of self-aligning torque Tsa in straightness securing section SG is carried out as follows: That is to say, at first, driving force difference ΔT (=TL−TR) of driving forces TR and TL of the right and left road wheels is calculated and a generation torque estimation control map shown in FIG. 12 is referred on a basis of calculated driving force difference ΔT to estimate a generation torque Th generated at the time of the steering operation due to a torque steer phenomenon.

This generation torque estimation control map is set for the vehicle in which the scrub radius is positive, namely, the positive scrub is adopted. This generation torque estimation control map is prepared as follows: That is to say, the lateral axis of FIG. 12 denotes driving force difference ΔT and the longitudinal axis of FIG. 12 denotes generation torque Th. When driving force difference ΔT is increased from zero to the positive direction, namely, when left wheel driving force TL is increased exceeding right wheel driving force TR, generation torque Th is set in proportion to the increase in driving force difference ΔT such as to be increased from zero to the positive direction in which the vehicle is turned in a rightward direction (positive direction). On the other hand, when driving force difference ΔT is increased from zero toward a negative direction, namely, when right wheel driving force TR is increased exceeding left wheel driving force TL, generation torque Th is set in proportion to the increase in driving force difference ΔT such as to be increased from zero to the direction in which the vehicle is turned in a leftward direction (negative direction).

Then, straightness securing section SG subtracts generation torque Th from steering torque Ts detected by steering torque sensor 5 to calculate self-aligning torque Tsa.

It should be noted that the calculation of self-aligning torque Tsa is not limited to the calculation thereof on a basis of right and left driving force difference ΔT but this calculation can be carried out on a basis of right and left braking force difference in the same way as the right and left driving force difference ΔT. In addition, the calculation of self-aligning torque Ts can be carried out in such a way that a yaw rate sensor detecting a yaw rate γ of the vehicle and a lateral acceleration sensor detecting a lateral acceleration Gy of the vehicle are installed and lateral force Fy is calculated on a basis of a differential value of the yaw rate and lateral acceleration Gy from a motion equation of the vehicle and self-aligning torque Ts is, then, calculated by multiplying this lateral force Fy by a pneumatic trail εn. Furthermore, self-aligning torque Tsa can also be calculated on a basis of steering angle θs of steering angle sensor SA and vehicle speed V by actually measuring or referring to the control map calculated through a simulation using the relationship between steering angle θs of steering wheel SW and self-aligning torque Tsa, with vehicle speed V as a parameter.

Then, straightness securing purpose current command value Isa* calculated by straightness securing section SG is supplied to adder AD described before. This adder AD adds straightness securing purpose current command value Isa* to target auxiliary torque command value I* calculated by target auxiliary torque current command value calculation section TO to calculate target actuator current command value Ia* and calculated target actuator current command value Ia* to subtracter SB.

Hence, power steering control section PC of steering control apparatus CT adds straightness securing purpose current command value Isa* calculated by straightness securing section SG to target auxiliary torque current command value It* calculated in accordance with steering torque Ts inputted to steering wheel SW and vehicle speed V to calculate target actuator current command value Ia*.

Electrically driven actuator EA is controlled on a basis of this target actuator current command value Ia*. Hence, electrically driven actuator EA causes a steering torque securing the straightness of suspension unit 1B to be generated, in addition to the steering auxiliary torque in accordance with the steering force transmitted to steering wheel SW, and transmits these torques to output side steering axle SSo.

Figure 13A:
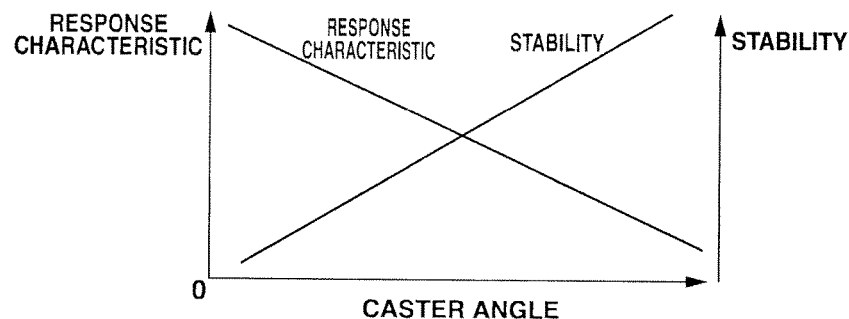
FIGS. 13(a) and 13(b) are graphs representing characteristics of the suspension unit, FIG. 13(a) being a view representing a relationship among a canister angle, a response characteristic, and a stability and FIG. 13(b) being a view representing a relationship among a canister trail, a lateral force reduction margin, and a straightness.

In addition, in the above-described embodiment, the caster angle of suspension unit 1B is set to zero. The relationship among the caster angle, a steering response characteristic, and a (steering) stability is such that, as shown in FIG. 13(a), when the caster angle is zero, a high steering response characteristic is exhibited but the (steering) stability cannot be secured. That is to say, a trade-off relationship between the steering response characteristic and the stability with respect to the caster angle is present.

Figure 13B:
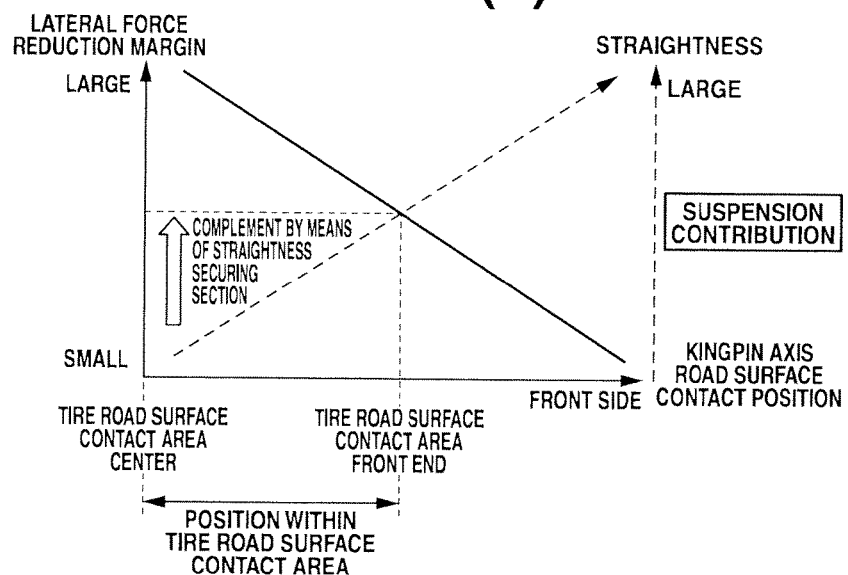
Figure 14:
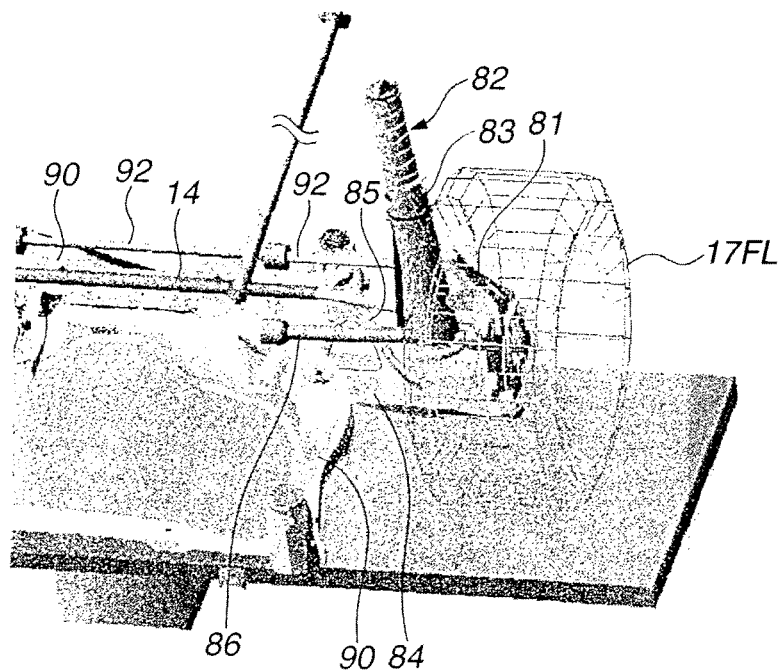
FIG. 14 is a perspective view of the suspension unit in a second preferred embodiment.
Figure 15:
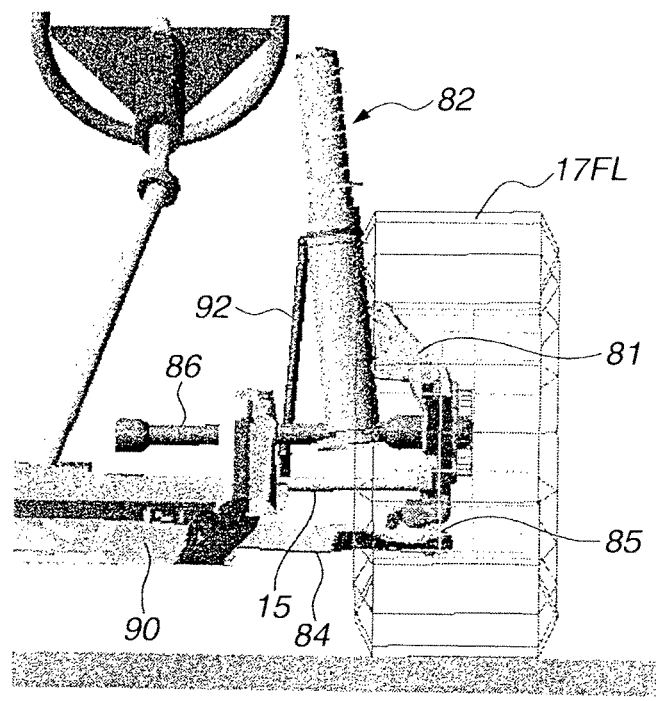
FIG. 15 is a front view of FIG. 14.
Figure 16:
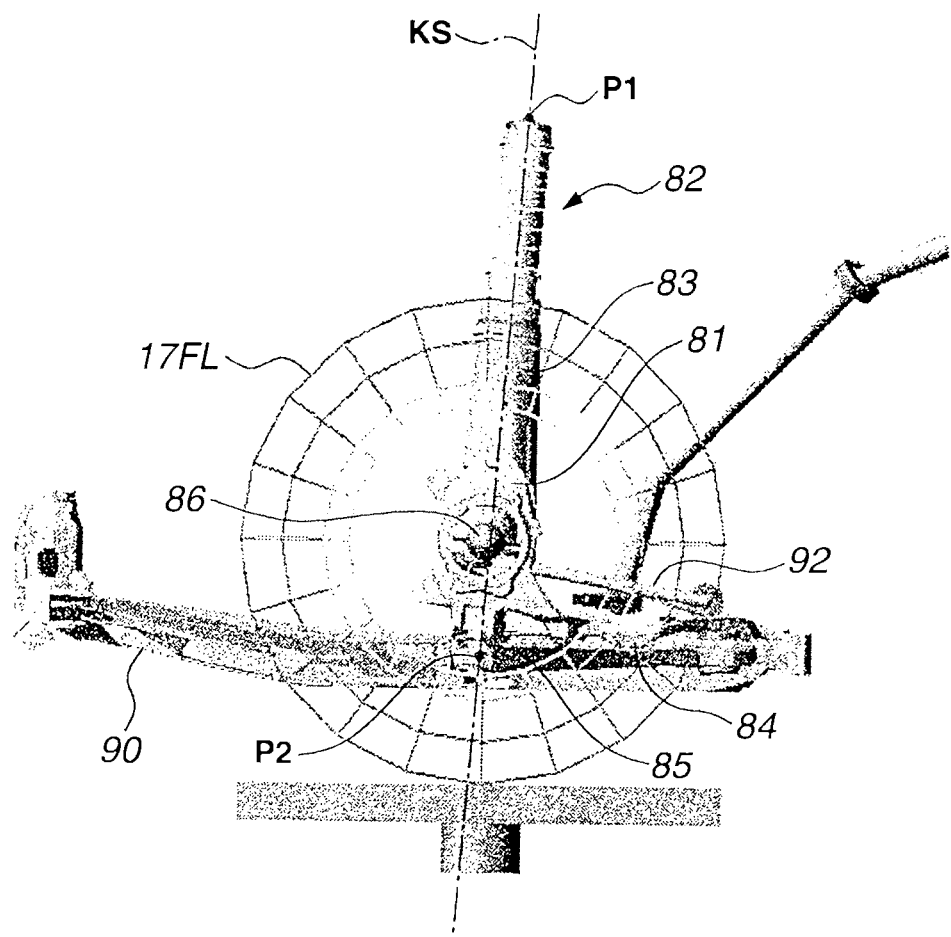
FIG. 16 is a side view of FIG. 14.
Figure 17:
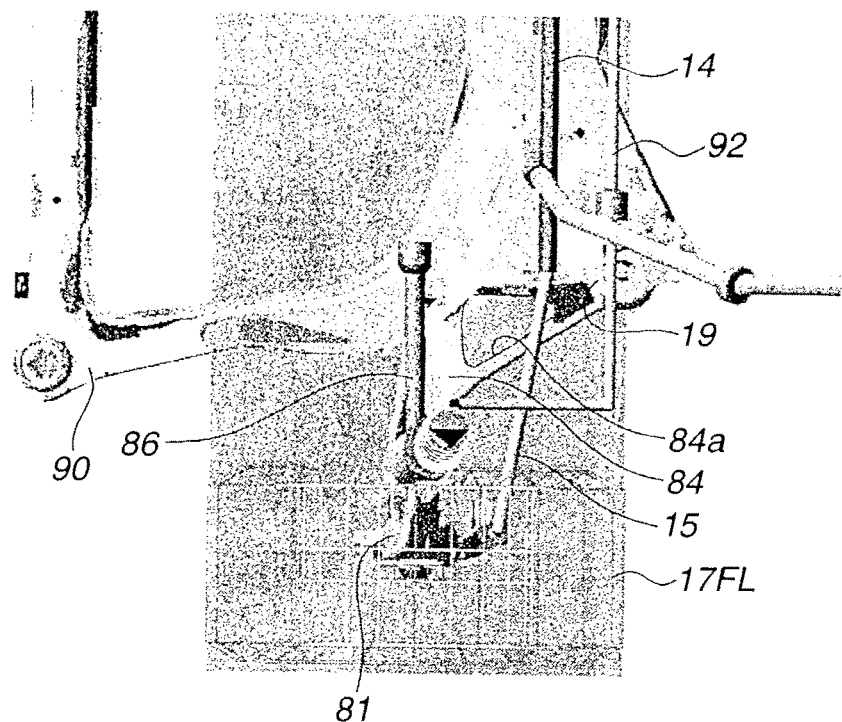
FIG. 17 is a plan view of FIG. 14.

On the other hand, the relationship among the road surface contact point position of kingpin axis KS, a lateral force reduction margin, and the straightness is as shown in FIG. 13(b). That is to say, in a state in which the contact point of kingpin axis KS is placed at the tire road surface contact area center, the lateral force reduction margin as denoted by the solid line of FIG. 13(b) becomes maximum. However, the straightness is not secured as denoted by a broken line of FIG. 13(b). Then, when the contact point of kingpin axis KS is moved toward the forward direction from the tire road surface contact area center, the lateral force reduction margin is gradually reduced and the straightness is gradually improved as the grounding (landing) point of kingpin axis KS becomes separated from the tire road surface contact area center.

Thereafter, when the contact point of kingpin axis KS reaches to a front end of the tire road surface contact area of the tire, the lateral force reduction margin is decreased to an about half the maximum value thereof but, on the contrary, the straightness becomes a favorable state.

Furthermore, when the grounding (landing) point of kingpin axis KS is moved toward the forward side exceeding the front end of the tire grounding area, the reduction margin of the lateral force is, furthermore, decreased from approximately half the maximum value but the straightness becomes furthermore favorable.

In the above-described embodiment, in order to enlarge the lateral force reduction margin, kingpin axis KS is set so as to pass within the tire road surface contact area, in a state in which steering wheel SW is in the neutral position. Therefore, the straightness of suspension unit 1B is reduced. This reduction of the straightness can be complemented by the control for electrically driven actuator EA using the straightness securing section SG. Thus, in the above-described first embodiment, straightness securing section SG serves to compensate for the reduction in the straightness in suspension unit 1B so that a sufficient straightness can be secured.

(Action)

Next, an action of suspension unit 1B in the first embodiment will be explained.

In suspension unit 1B in this embodiment, the caster trail is set to be positioned within the road surface contact area of the tire.

For example, the settings of the kingpin axis are such that the caster angle of 0 degree, the caster trail of 0 mm, and the positive scrub of the scrub radius of 0 mm or larger are set.

In addition, the kingpin inclination angle is set to a value within a range of a smaller angle (for example, 15 degrees or lower) in which the scrub radius can be set to provide the positive scrub.

The above-described suspension geometry is adopted in this embodiment. Hence, the variation of the locus of the tire road surface contact area center is made smaller and, thus, the tire torsional torque can be reduced.

Therefore, the rack axial force can be made smaller so that the moment around kingpin axis KS can be made smaller and the output of steering actuator 8 can be reduced. In addition, a smaller force can control a direction (orientation) of the road wheels. That is to say, the improvement in the maneuverability and stability can be achieved. Accordingly, cross sectional areas of the respective link members constituting suspension unit 1B and the rack axle can be reduced and suspension unit 1B itself can be light weighted. Thus, vehicle 1 can accordingly be light weighted.

In addition, since the caster angle is set to 0 degree and the caster trail is set to 0 mm, there is a possibility of developing an influence of the suspension structure on the straightness. However, since the scrub radius is set as the positive scrub, its influence is reduced. Furthermore, the straightness complement control based on self-aligning torque Tsa by means of straightness securing section SG permits the security of the straightness of suspension unit 1B. Hence, the maneuverability and stability of the vehicle can be improved.

In addition, since the kingpin inclination angle is limited within a constant range, the steering of electrically driven actuator EA is carried out so that such a situation that a vehicle driver gives a feeling of a weight (load) on the steering operation can be avoided. Then, since electrically driven actuator EA can oppose against an external force when the external force is applied to vehicle 1 due to a kick-back of the external force from the road surface, the influence on the vehicle driver can be avoided. That is to say, the improvement in the maneuverability and stability can be improved.

In addition, since suspension unit 1B in this embodiment is of the strut type, the number of parts can furthermore be reduced and the settings of kingpin axis KS in this embodiment can be facilitated.

As described hereinabove, according to suspension unit 1B in this embodiment, the kingpin axis is set to pass within the tire road surface contact area in a state in which the steering wheel is placed at the neutral position. Hence, the moment around the kingpin axis can be made smaller.

Hence, since, in the above-described first embodiment, the steering can be carried out with the smaller rack axial force and the direction of the road wheels can be controlled with the smaller force, the maneuverability and stability of the vehicle can be improved while the light weighting of the suspension unit is achieved.

It should be noted that, in this embodiment, first link 37, second link 38, shock absorber 40 correspond to a plurality of link members. First link 37 and second link 38 correspond to lower arms. Spring members 34, 34 and shock absorbers 40, 40 correspond to the strut members.

(Effect of the First Embodiment)

(1) The kingpin axis is set to pass within the road surface contact area (contact patch) of the tire, in a state in which the steering wheel is placed at the neutral position.

Thus, the moment around the kingpin axis can be made smaller so that the steering can be carried out with a smaller rack axial force and the direction of the road wheels can be controlled with a smaller force.

Therefore, in this embodiment, the maneuverability and stability of the vehicle can be improved while the light weighting of the suspension unit is achieved.

(1)' The caster trail of the kingpin axis is placed within the tire road surface contact area.

Thus, the moment around the kingpin axis can be made smaller. Hence, the steering can be carried out with the smaller rack axial force and the direction (orientation) of the road wheels can be controlled with a smaller force.

Hence, while the light weighting of the suspension unit is achieved, the maneuverability and stability can be improved.

(1)" The kingpin axis is set to pass through a vicinity of the tire road surface contact area center within the tire road surface contact area.

This permits the minimization of the moment around the kingpin axis. Thus, the steering can be performed with a smaller rack axial force and the direction of the road wheels can be controlled with a smaller force.

Hence, in this embodiment, while the light weighting of the suspension unit is achieved, the maneuverability and stability can be improved.

(2) The straightness securing section is provided in the steering control apparatus, this straightness securing section securing the straightness of the vehicular suspension unit.

Hence, for example, utilizing the electrically driven actuator in an electrically operated power steering system, the straightness securing control corresponding to the settings of the kingpin axis according to the present invention can be carried out.

Thus, in this embodiment, while the light weighting of the suspension unit is achieved, the maneuverability and stability can be improved.

(2)' The straightness securing section secures the straightness by calculating the self-aligning torque.

Hence, the straightness securing section secures the high response characteristic of the suspension unit itself so that the reduced straightness can be secured by the self-aligning torque and the maneuverability and stability can be improved.

(3) The vehicular suspension unit according to the present invention is applicable to the strut (type) suspension mechanism.

Therefore, the number of parts constituting the suspension can be less and the settings of the kingpin axis can be facilitated.

(4) This embodiment includes a geometry adjusting method of the vehicular suspension unit in which the road surface contact point of kingpin axis KS is set to be placed within the tire road surface contact area, in a state in which the steering wheel is in the neutral position.

Thus, the moment around the kingpin axis KS can be made smaller. Thus, the steering can be carried out with the smaller rack axial force and the direction of the road wheels can be controlled with the smaller force.

Hence, in this embodiment, while the light weighting of the suspension unit is achieved, the maneuverability and stability of the vehicle can be improved.

(Alternative 1)

In the first embodiment, kingpin axis KS is set to pass within the tire road surface contact area in the state in which the steering wheel is in the neutral position and the caster trail is set within the tire contact area, as one example of the setting of the caster trail, the caster trail gives a value near to zero.

On the other hand, in an alternative 1, kingpin axis KS is limitedly set to pass through a range from the center of the tire (road surface) contact area to the front end of the tire contact area, in the state in which the steering wheel is in the neutral position. In addition, the setting condition of the caster trail is limited to the range from the center of the tire contact area to the forward end of the tire contact area.

(Effect)

In the state in which the steering wheel is in the neutral position, the kingpin axis is set to pass through the range from the center of the tire contact area to the front end of the tire contact area and the caster trail is set to the distance from the tire contact area center to the front end of the tire contact area. Consequently, the securing of the straightness and the reduction in the weight (load) of the steering operation becomes compatible. That is to say, in the above-described structure, while the light weighting of the suspension unit is achieved, the maneuverability and stability can be improved.

(Alternative 2)

In the first embodiment, the region enclosed by the dot-and-dash line is exemplified as the region suitable for the settings in a coordinate plane shown in FIG. 7. Whereas, with one of the isolines of the rack axial force to be noticed as a boundary line, a region inner side than the range indicated by this boundary line (in the decrease direction of the kingpin inclination angle and in the increase direction of the scrub radius) can provide the region suitable for the settings.

(Effect)

With a maximum value of the rack axial force supposed, the suspension geometry can be set to a range equal to or smaller than the maximum value.

(Modification)

It should be noted that, in the first embodiment described above, steering control apparatus CT is constituted by power steering control section PC and straightness securing section SG. However, the present invention is not limited to this structure.

As a steering control apparatus CS, only straightness securing section SG may be installed with power steering control section PC omitted. In this (modification) case, in the structure shown in FIG. 11, target auxiliary torque current command value calculation section TO and adder AD are omitted so that straightness securing purpose current command value Isa* outputted from straightness securing section SG may directly be inputted to subtracter SB.

In addition, in the above-described first embodiment, straightness securing purpose current command value Isa* is calculated on a basis of self-aligning torque Tsa at straightness securing section SG. However, the present invention is not limited to this. For example, a fixture value represented by an average value of self-aligning torque Tsa may be set.

(Second Preferred Embodiment)

Next, a second preferred embodiment according to the present invention will be described below with reference to FIGS. 14 through 19.

In the second embodiment, the structure of suspension unit 1B is more specific and the present invention is applicable to a multilink suspension.

That is to say, in the second embodiment, for an explanation simplicity purpose, the specific structure of left side steerable wheel 17FL from between right and left steerable wheels 17FL, 17FR will be explained.

Steerable road wheel 17FL is rotatably supported by means of an axle member 81, as shown in FIGS. 14 through 17. This axle member 81 has an upper end section fixed to an outer envelope of a shock absorber 83 constituting a strut 82 and a lower end section linked to a lower arm 84 constituted by A arm via a ball joint 85. Then, axle member 81 has a center section in a vertical direction thereof through which an axle shaft 86 is supportably inserted, steerable road wheel 17FL being fixed to this axle shaft 86.

Strut 82 is linked to a supporting section of the vehicle body side at upper pivot point P1 of the upper end section of strut 82 in the same way as the above-described first embodiment.

Figure 18:
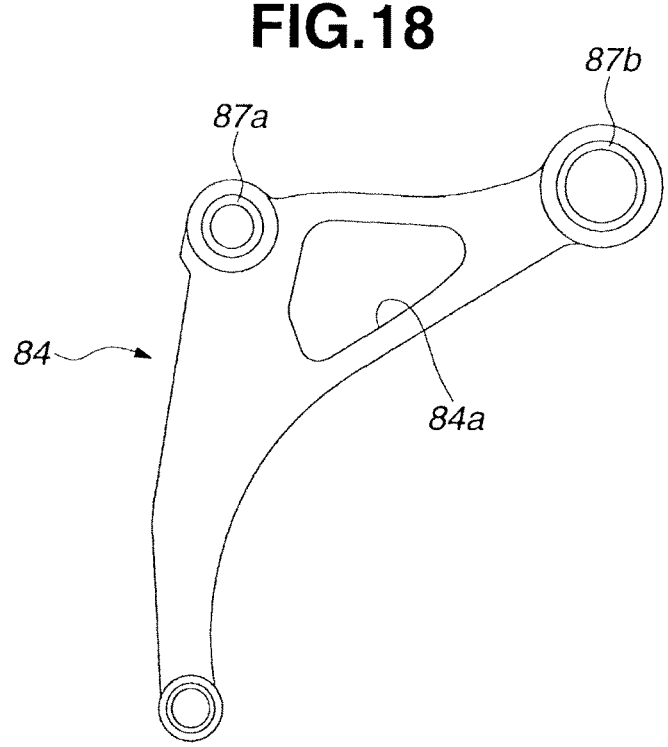
FIG. 18 is a plan view representing a lower arm applicable to the second preferred embodiment.

Lower arm 84 is, as shown in FIG. 18, constitutes the A arm and an opening section 84a is formed on lower arm 84 at a vehicle backward side from a center section thereof to achieve the light weighting. This makes lower arm 84 a flexible structure in the forward-or-backward direction of the vehicle and a stiff structure in the vehicle width direction.

Figure 19:
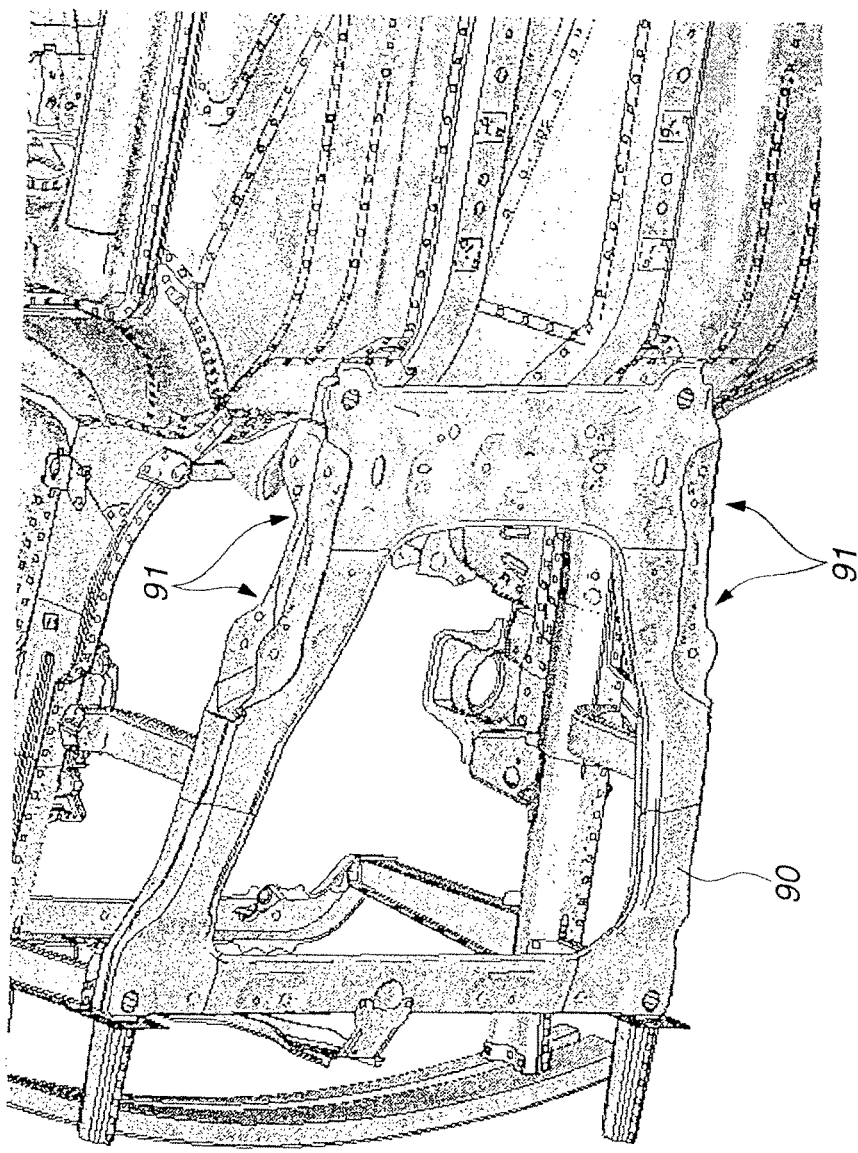
FIG. 19 is a perspective view representing a sub frame to fix the lower arm shown in FIG. 18.

Then, two parts of a base section side of lower arm 84 spaced apart from each other in the vehicle forward-or-backward direction is fixed to an arm attachment section 91 of a sub frame 90 shown in FIG. 19 via elastic bushes 97a, 87b.

In addition, tie rod 15 passing through a rear side of strut 82 is linked at the vehicle backward side of axle member 81 and other end of tie rod 15 is linked to rack axle 14.

In addition, one end of a stabilizer 92 whose center section is pivotably supported on a vehicle body side member is attached to a lower end side of the outer envelope of strut 82.

Then, the inclination angle of kingpin axis KS connecting between upper pivot point P1 located at the upper end section of strut 82 of suspension unit 1B and lower pivot point P2 of lower arm 84 supporting axle member 81, the caster angle, the caster trail, the scrub radius, the kingpin offset, and so forth are set in the same way as described in the first embodiment.

Hence, in the second embodiment, the same action and effect as the first embodiment described above can be obtained by suspension unit 1B.

In addition, in the second embodiment, the lateral force acted upon the center of the contact area of the tire (point of application of force) can be made small as described in the first embodiment. Hence, the force applied to the lower arm can be made small. Therefore, a stiffness of the lower arm can be reduced and the light weighting of the suspension unit can be achieved.

(Modification of Suspension Unit)

It should be noted that suspension unit 1B is not limited to the structure of each of the first and second embodiments. As the suspension unit, a suspension structure shown in FIGS. 20(a) through 20(c) may be applied. That is to say, in this suspension unit, a bracket 104 attached onto the lower end section of shock absorber 103 constituting a strut 102 is fixed onto the upper end of axle member 101 to which a hub 100 is attached, a hub 100 supporting each of steerable wheels 17FL and 17FR. In addition, the vehicle body outer side attaching section of lower arm 105 having a deformed A arm structure is fixed via a ball joint 106.

Figure 20A:
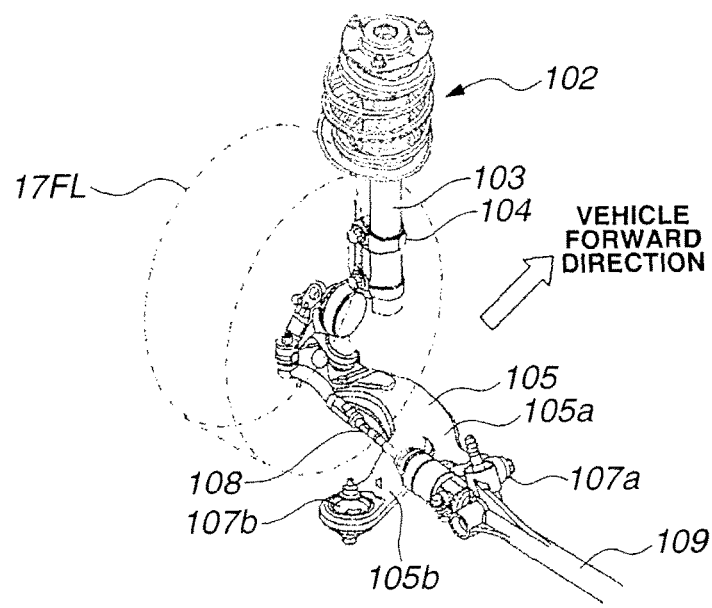
FIGS. 20(a), 20(b), and 20(c) are perspective view, front view, and side view representing the suspension unit in a modification to the suspension unit in the first and second embodiments.

In addition, lower arm 105 has a vehicle inner side (inside of the vehicle) branched into a forward arm section 105a and a backward arm section 105b. Forward arm section 105a is pivotably supported on a vehicle body side member via an elastic bush 107a as shown in FIG. 20(a) within a vertical plane in the vehicle width direction. Backward arm section 105b is supported on the vehicle body side member via an elastic bush 107b whose center axis is in a vehicle vertical direction, as shown in FIG. 20(a).

Furthermore, a rack axle 109 is linked to a vehicle backward side of axle member 101 via a tie rod 108.

Figure 20B:
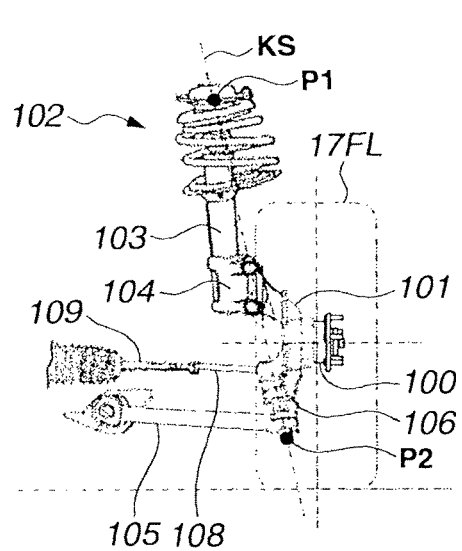
Figure 20C:
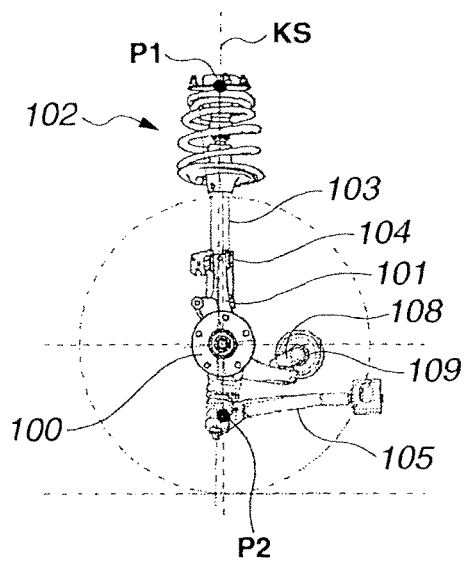

In this structure, the inclination angle of kingpin axis KS connecting upper pivot point P1 located at the upper end of strut 102 and lower pivot point P2 which is a linking point of axle member 101 to lower arm 105, the caster angle, the caster trail, the scrub radius, the kingpin offset, and so forth are set in the same way as the first embodiment described before so that the same action and effect can be obtained. In addition, since the suspension unit is structured as shown in FIGS. 20(a), 20(b), and 20(c), the suspension unit can more be simplified and a lower cost of the suspension unit can be achieved.

(Third Embodiment)

Next, a third preferred embodiment according to the present invention will be described with reference to FIGS. 21 through 26.

In the third embodiment, the present invention is applicable to a steer-by-wire system as the steering system and the straightness of the suspension unit can more accurately be secured.

Figure 21:
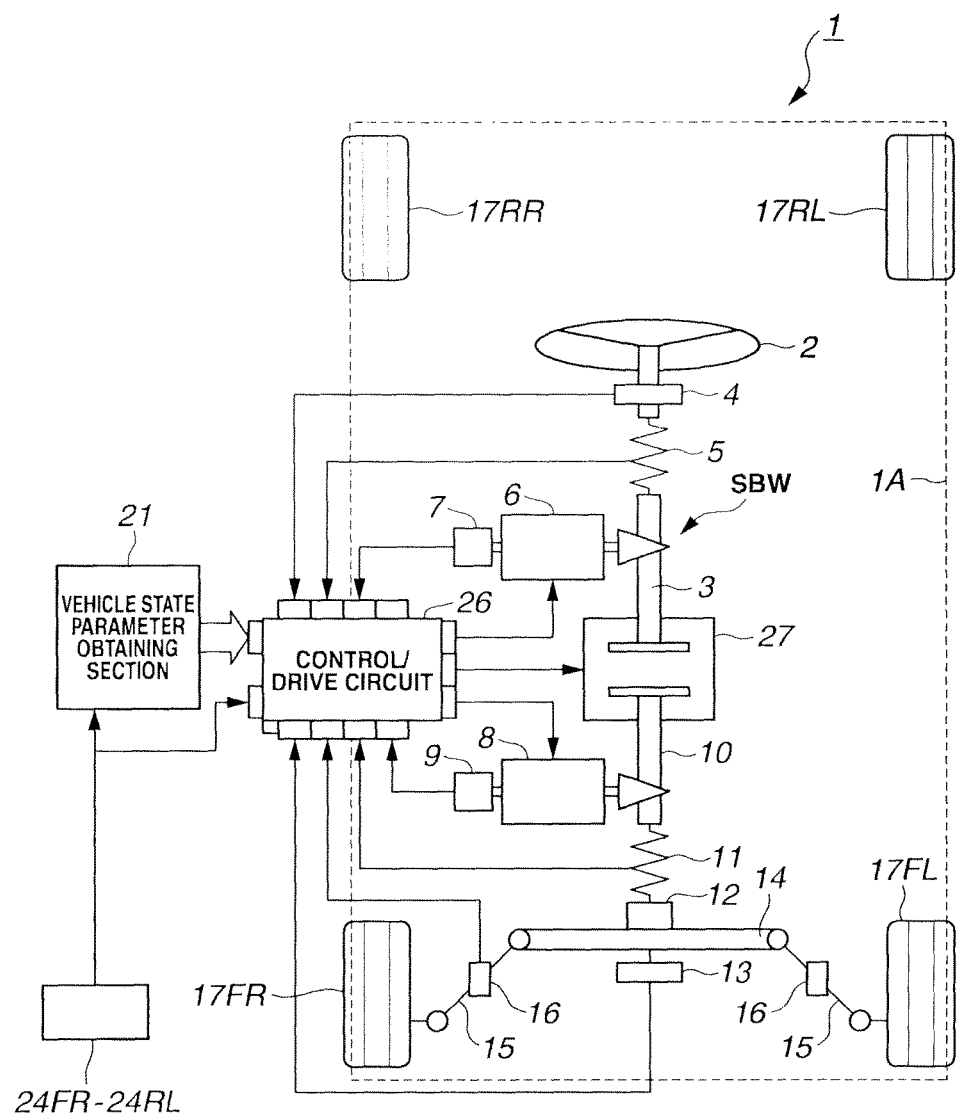
FIG. 21 is a rough configuration view representing a structure of automotive vehicle 1 related to a third preferred embodiment according to the present invention.

That is to say, as shown in FIG. 21, automotive vehicle 1 includes vehicle body 1A and steer-by-wire system SBW. Steer-by-wire system SBW includes: a steering wheel 2; an input side steering axle 3; a steering angle sensor 4; a steering torque sensor 5; a steering reaction force actuator 6; a steering reaction force actuator angle sensor 7; a steering actuator 8; a steering actuator revolution angle sensor 9; an output side steering axle 10; a steering torque sensor 11; a pinion gear 12; a pinion angle sensor 13; a rack axle 14; a tie rod 15; a tie rod axial force sensor 16; road wheels 17FR, 17FL, 17RR, 17RL; a vehicle state parameter obtaining section 21; road wheel speed sensors 24FR, 24FL, 24RR, 24RL; a control/drive circuit unit 26; and a mechanical back-up 27.

Steering wheel 2 is constructed to rotate integrally with input side steering axle 3 and the steering input by the vehicle driver is transmitted to input side steering axle 3. Input side steering axle 3 includes steering reaction force actuator 6. The steering reaction force by means of steering reaction force actuator 6 is applied to the steering input inputted from steering wheel 2.

Steering angle sensor 4 is attached to input side steering axle 3 and detects a rotational (revolution) angle of input side steering axle 3, namely, a steering angle θs inputted to steering wheel 2 by the vehicle driver. Then, steering angle sensor 4 outputs steering angle θs inputted to steering wheel 2 with the driver to control/drive circuit unit 26. Then, steering angle sensor 4 outputs steering angle θs of input side steering axle 3 to control/drive circuit unit 26.

Steering torque sensor 5 is attached to input side steering axle 3 and detects a running torque (namely, a steering input torque to steering wheel 2). Then, steering torque sensor 5 outputs the detected running torque of input side steering axle 3 to control/drive circuit unit 26.

Steering reaction force actuator 6 has a gear integrally rotated with a motor shaft which is meshed with a gear formed on a part of input side steering axle 3 and provides a reaction force against a rotation of input side steering axle 3 by means of steering wheel 2 in accordance with a command of control/drive circuit unit 26.

Steering reaction force actuator angle sensor 7 detects a rotational angle of reaction force actuator 6 (namely, a rotational angle according to the steering input transmitted to steering reaction force actuator 6) and outputs the detected rotational angle to control/drive circuit unit 26.

Steering actuator 8 has a gear integrally rotating the motor shaft which is meshed with a gear formed on a part of output side steering axle 10 and rotates output side steering axle 10 in accordance with the command of control/drive circuit unit 26.

Steering actuator rotational angle sensor 9 detects a rotational angle of steering actuator 8 (namely, a rotational angle for the steering outputted by steering actuator 8) and outputs the detected rotational angle to control/drive circuit unit 26.

Output side steering axle 10 includes steering actuator 8 and the rotation inputted by steering actuator 8 is transmitted to pinion gear 12.

Steering torque sensor 11 is installed on output side steering axle 10 and detects the rotational (running) torque of output side steering axle 10 (namely, the steering torque of each of road wheels 17FR, 17FL via rack axle 14).

Steering torque sensor 11 outputs the detected running (rotational) torque of output side steering axle 10 to control/drive circuit unit 26.

Pinion gear 12 is meshed with rack axle 14 and transmits the inputted rotation from output side steering axle 10 to rack axle 14.

Pinion angle sensor 13 detects the rotational angle of pinion gear 12 (namely, the steering angle of road wheels 177FR, 17FL outputted via rack axle 14) and outputs the rotational angle of pinion gear 12 to control/drive circuit unit 26.

Rack axle 14 is provided with a spur gear to be meshed with pinion gear 12 and converts the rotation of pinion gear 12 into a linear motion in the vehicle width direction.

Tie rods 15, 15 are respectively linked between both end sections of rack axle 14 and the knuckle arms of road wheels !7FR, 17FL via ball joints. Tie rod axial force sensors 16, 16 output detected axial forces of tie rods 15 to control/drive circuit unit 26.

Road wheels 17FR, 17FL, 17RR, 17RL are constituted by tires attached onto tire wheels and are disposed on vehicle body 1A via suspension unit 1B. From among of these road wheels, front road wheels (road wheels 17FR, 17FL) are designed so that the corresponding knuckle arms are swung by means of corresponding tie rods to change the direction (orientation) of road wheels 17FR, 17FL with respect to vehicle body 1A.

Vehicle state parameter obtaining section 21 obtains the vehicle speed on a basis of pulse signals representing rotational speeds of respective road wheels outputted from road wheel speed sensors 24FR, 24FL, 24RR, 24RL. In addition, vehicle state parameter obtaining section 21 obtains slip rates of the respective road wheels on a basis of the vehicle speed and the rotational speeds of respective road wheels. Then, vehicle state parameter obtaining section 21 outputs the obtained parameters to control/drive circuit unit 26.

Road wheel speed sensors 24FR, 24FL, 24RR, 24RL outputs the pulse signals representing rotational speeds of the respective road wheels to vehicle state parameter obtaining section 21 and control/drive circuit unit 26.

Control/drive circuit unit 26 controls a whole automotive vehicle 1 and outputs each of various kinds of control signals related to the steering reaction force of input side steering axle 3, the steering angle of the front road wheels, or a linkage of mechanical back-up 27 to steering reaction force actuator 6, steering actuator 8, or mechanical back-up 27.

In addition, control/drive circuit unit 26 converts the detected value by means of each sensor into a value in accordance with a purpose of use. For example, control/drive circuit unit 26 converts the rotational angle detected by means of steering reaction force actuator angle sensor 7 into a steering input angle, converts the rotational angle detected by means of steering reaction force actuator angle sensor 9 into the steering angle of the road wheels, and converts the rotational angle of pinion gear 12 detected by pinion angle sensor 13 into a steering angle of the road wheels.

It should be noted that control/drive circuit unit 26 monitors the steering angle of input side steering axle 3 detected by steering angle sensor 4, the rotational angle of steering reaction force actuator 6 detected by steering reaction force actuator angle sensor 7, the rotational angle of steering actuator 8 detected by means of steering actuator rotational angle sensor 9, and the rotational angle of pinion gear 12 detected by pinion angle sensor 9 and can detect an occurrence of failure in the steering system on a basis of these relationships. Then, when the occurrence of failure in this steering system is detected, control/drive circuit unit 26 outputs a command signal to link between input side steering axle 3 and output side steering axle 10 to mechanical back-up 27.

Mechanical back-up 27 is a mechanism linking between input side steering axle 3 and output side steering axle 10 in accordance with the command issued from control/drive circuit unit 26 and securing the transmission of force from input side steering axle 3 to output side steering axle 10. It should be noted that, during a normal state, control/drive circuit unit 26 commands a state such that input side steering axle 3 is not linked to output side steering axle 10 to mechanical back-up 27. Then, in a case where it becomes necessary to perform the steering operation without intervention of steering angle sensor 4, steering torque sensor 5, steering actuator 8, and so forth due to the occurrence of failure in the steering system, the command to link input side steering axle 3 to output side steering axle 10 is inputted to mechanical back-up 27.

It should be noted that mechanical back-up 27 can be constituted by, for example, a cable type steering mechanism or so forth.

It should also be noted that control/drive circuit unit 26, as described before, inputs steering torque Ts of input side steering axle 3 detected by steering torque sensor 5, vehicle speed V obtained in vehicle state parameter obtaining section 21, rotational angle θmi of steering reaction force actuator 6 detected by steering actuator rotational angle sensor 9, and rotational angle θmo of steering actuator 8 detected by steering actuator rotational angle sensor 9. Furthermore, control/drive circuit unit 26 receives the pulse signals representing the rotational speeds of the respective road wheels detected by road wheel speed sensors 24FR, 24FL, 24RR, 24RL.

Figure 22:
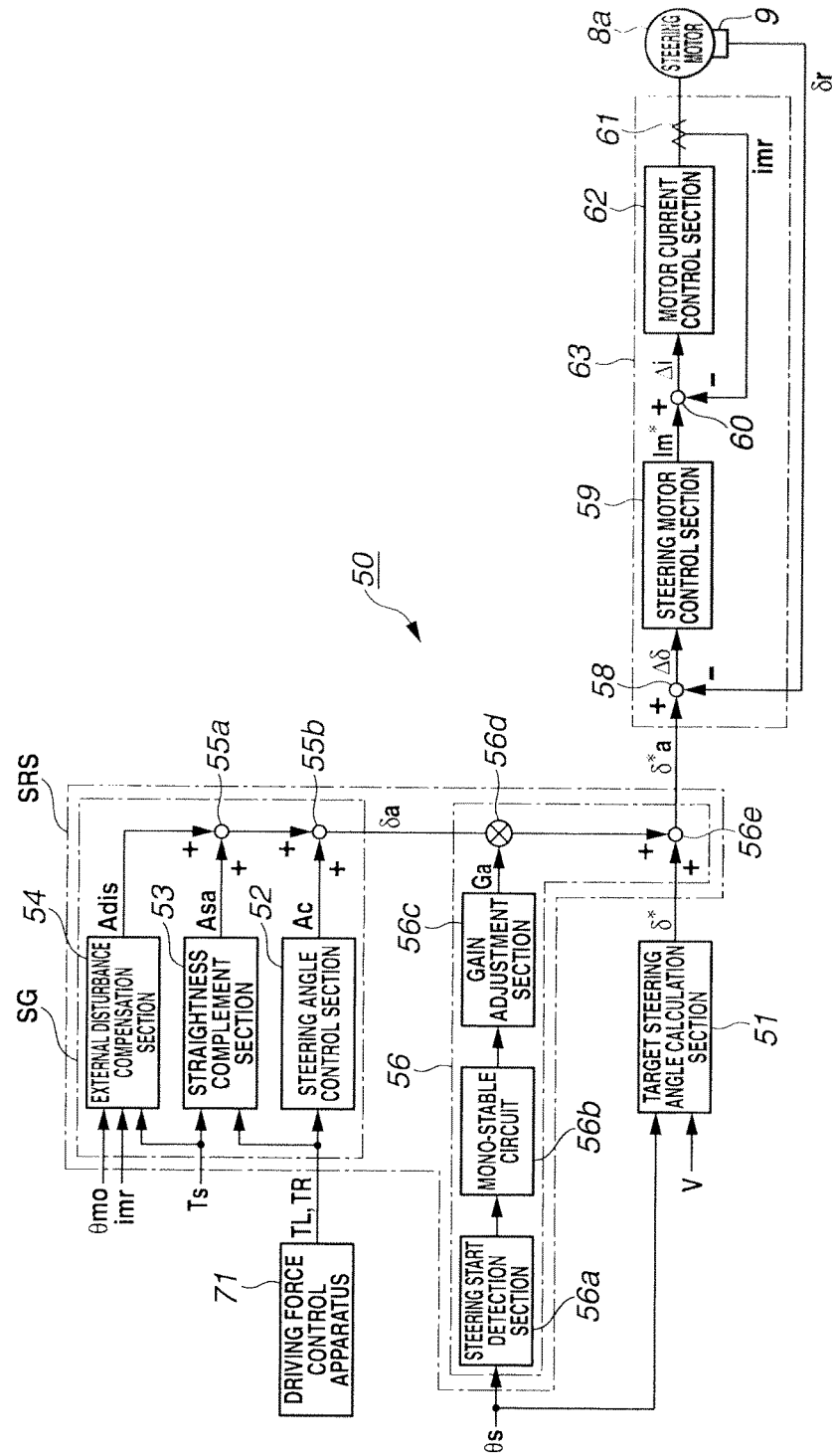
FIG. 22 is a block diagram representing one example of a steering control apparatus in the third preferred embodiment according to the present invention.

This control/drive circuit unit 26 includes a steering control apparatus 50 shown in FIG. 22. This steering control apparatus 50 includes: a target steering angle calculation section 51; a steering angle control section 52; a straightness complement section 53; an external disturbance compensation section 54; a delay control section 56; a steering angle deviation calculation section 58; a steering motor control section 59; a current deviation calculation section 60; and a motor current control section 62.

Target steering angle calculation section 51 inputs steering angle θs detected by steering angle sensor 4 and vehicle speed V and calculates target steering angle δ* on a basis of these data.

Steering angle control section 52 calculates variation quantities Δfl, Δfr of steering angles of steerable wheels 17FL, 17FR due to a compliance steer. These variation quantities Δfl, Δfl are calculated by carrying out the calculations recited in an equation (1) and an equation (2) on a basis of driving forces TL, TR of left and right road wheels outputted from driving force control apparatus 71 which distributes and controls the driving forces of steerable left and right road wheels 17FL, 17FR which are left and right driving wheels of the vehicle and a compliance steer coefficient of in accordance with deflections of the bushes of lower links 37, 38. Then, steering angle control section 52 calculates a displacement difference of calculated variation quantities Δfl, Δfr and calculates a compliance steer control value Ac as a steering angle control value Ac (=Δfl−Δfr).

$$\Delta fl = af \cdot TL \quad (1)$$

$$\Delta fr = af \cdot TR \quad (2)$$

Straightness complement section 53 inputs driving forces TL, TR of the left and right road wheels outputted from driving force control apparatus 71 which distributes and controls the driving wheel driving forces in the same way as straightness securing section SG in the first embodiment described before, inputs steering torque Ts detected by steering torque sensor 5, calculates self-aligning torque Tsa on a basis of these data, and calculates a self-aligning torque control value Asa (=Ksa·Tsa) as a straightness securing purpose command value by multiplying calculated self-aligning torque Tsa by predetermined steering angle correction gain Ksa.

External disturbance compensation section 54 inputs steering torque Ts from steering torque sensor 5, rotational angle θmo from steering actuator rotational angle sensor 9, and motor current imr from a motor current detection section 61, separates external disturbances inputted to the vehicle for each of frequency bands to estimate the respective external disturbances, and calculates an external disturbance compensation value Adis to suppress these external disturbances.

This external disturbance compensation section 54 includes a plurality of external disturbance estimation sections, each of which, in a model with steering torque Ts which is the steering input by the driver and the steering input by steering actuator 8 as a control input and with an actual steering state variable as a controlled variable, estimates the individual external disturbances on a basis of a difference between a value of the control input in which the control input is passed through a low pass filter and a value of the controlled variable passed through an inverse characteristic of the model External disturbance compensation section 54 is described in a Japanese Patent Application First Publication (tokkai) No. 2007-237840.

The respective external disturbance estimation sections separates the external disturbances from one another for each of a plurality of frequency bands by making cut-off frequencies of the low pass filters in the external disturbance estimation sections different.

Then, an adder 55a adds external disturbance complement value Adis calculated by external disturbance compensation section 54 and self-aligning torque control value Asa calculated by straightness complement section 53 together. The addition output of adder 55a and compliance steer control value Ac calculated by steering angle control section 55b are added in an adder 55b to calculate straightness securing control value δa. This straightness securing control value δa is supplied to delay control section 56.

It should be noted that, as shown in FIG. 22, straightness securing section SG is constituted by steering angle control section 52, straightness complement section 53, external disturbance compensation section 54, and adders 55a, 55b. This straightness securing section SG and delay control section 56 as will be described below constitute a steering response characteristic setting section SRS.

Delay control section 56, as shown in FIG. 22, includes: a steering start detection section 56a; a mono-stable circuit 56b; a gain adjusting section 56c; and a multiplier 56d.

Steering start detection section 56a detects a timing of a leftward steering or a rightward steering in a state in which the neutral position is maintained on a basis of steering angle θs detected by steering angle sensor 4 and outputs a steering start signal SS representing a start of steering from the neutral state to a mono-stable circuit 56b. In addition, mono-stable circuit 56b outputs a control start delay signal which is in an on state for a predetermined delay time, for example, 0.1 seconds on a basis of the steering start signal outputted from steering start detection section 56a to gain adjustment section 56c.

Gain adjustment section 56c sets a control gain Ga to "0" when the control start delay signal is in the on state and sets control gain Ga to "1" when the control start delay signal is in the off state. Gain adjustment section 56c outputs set control gain Ga to multiplier 56d.

Multiplier 56d inputs straightness securing control value δa outputted from straightness securing section SG, multiplies this straightness securing control value δa by control gain Ga and outputs a multiplied result to adder 56e at which a target steering angle δ* from target steering angle calculation section 51 is inputted.

Hence, gain adjustment section 56c of delay control section 56 sets control gain Ga to be multiplied by straightness securing control value δa to "0" so that the straightness securing control value δa calculated by straightness securing section SG to target steering angle θ* is stopped for a predetermined time set by mono-stable circuit 56b, for example, 0.1 seconds, when the steering start state in which the rightward steering or leftward steering is carried out from a state in which the neutral state is maintained. Then, gain adjustment section 56c sets control gain Ga to "1" so as to start the straightness securing control such that straightness securing control value δa is added to target steering angle δ*.

Then, gain adjustment section 56c of delay control section 56 sets control gain Ga to "1" due to the maintenance of an off state of output of mono-stable circuit 56b since steering start detection section 56a does not detect the start of steering from the neutral state when the steering of steering wheel 2 is continued. Hence, straightness securing control value δa calculated by straightness securing section SG is kept supplied to adder 56e. Therefore, straightness securing control value δa is added to target steering angle δ* to perform the straightness securing control.

Steering angle deviation calculation section 58 subtracts an actual steering angle δr outputted from actuator rotational angle sensor 9 of steering actuator 8a constituting actuator 8 from a post-addition target steering angle δ*a which is an addition of target steering angle δ* outputted from target steering angle calculation section 51 to straightness securing control value δa to calculate a steering angle deviation Δδ and outputs calculated steering angle deviation Δδ to steering motor control section 59.

Steering motor control section 59 calculates a target drive current im* in order for steering motor 8a constituting actuator 8 to provide zero of inputted steering angle deviation Δδ and outputs calculated target drive current im* to current deviation calculation section 60.

Current deviation calculation section 60 subtracts an actual motor current imr outputted from a motor current detection section 61 detecting a motor current supplied to steering motor 8a constituting actuator 8 from inputted target drive current im* to calculate current deviation Δi and outputs calculated current deviation Δi to motor current control section 62.

Motor current control section 62 performs a feedback control in order for inputted current deviation Δi to be zero, namely, in order for actual motor drive current imr to follow up target drive current im* and outputs actual motor drive current imr to steering motor 8a.

It should be noted that steering angle deviation calculation section 58, steering motor control section 59, current deviation calculation section 60, motor current detection section 61, and motor current control section 62 constitutes an actuator control apparatus 63.

This actuator control apparatus 63 controls the steering angle so that rotational angle δr detected by steering actuator rotational angle sensor 9 is made coincident with target steering angle δ*. Thus, when the vehicle is in the straight running state and target steering angle δ* is "0", the rotational angle is controlled so that rotational angle δr is made coincident with target steering angle δ*. Thus, when straightness securing section SG described before is in a main straightness securing section, actuator control apparatus 63 constitutes a sub straightness securing section.

(Operation of the Third Embodiment)

Next, an operation of the above-described third preferred embodiment will be described along with FIGS. 24(a) through 25(b).

Suppose now that the vehicle is in the straight running state with steering wheel 2 held at the neutral position.

In this straight running state, target steering angle δ* calculated by target steering angle calculation section 51 is zero. At this time, the driving forces or the braking forces of steerable wheels 17FL, 17FR which are the left and right driving wheels are made equal to each other since steering wheel 2 is held at the neutral position. Therefore, displacements (variation quantities) Δfl and Δfr of the steering angles of steerable wheels 17FL, 17FR due to the compliance steer calculated by equations (1) and (2) calculated in steering angle control section 52 are made equal to each other. Therefore, since a compliance steer correction quantity Ac is a subtraction value of variation quantity Δfr from variation quantity Δfl, compliance steer correction quantity Ac is made to zero.

Figure 23:
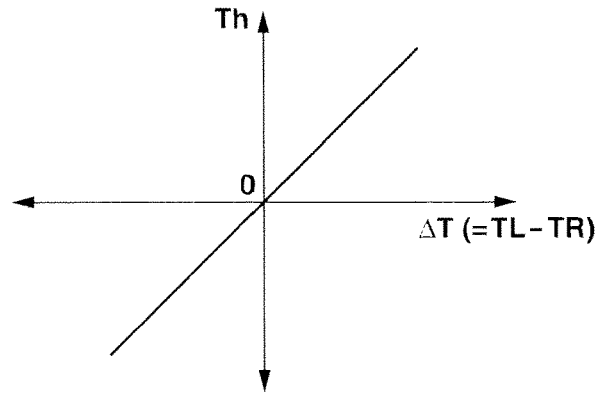
FIG. 23 is a view representing a generation torque control map to estimate the self-aligning torque.

In the same way, straightness complement section 53 zeroes driving force difference ΔT since driving forces of TL and TR are made equal to each other and zeroes generation torque Th calculated by referring to a generation torque estimation control map shown in FIG. 23. On the other hand, since steering wheel 2 is not steered in the straight running state, steering torque Ts is accordingly zeroed. Since steering wheel 2 is not operated (steered) in the straight running state, steering torque Ts is made zero so that self-aligning torque Tsa is also zero and self-aligning toque control value Asa is also zeroed.

On the other hand, external disturbance compensation section 54 calculates an external disturbance compensation value Adis which suppresses the external disturbances. Hence, straightness securing control value δa is only a value of external disturbance compensation value Adis. This straightness securing control value δa is supplied to multiplier 56d of delay control section 56.

In this delay control section 56, the output of mono-stable circuit 56b maintains the off state since the steering start at steering start detection section 56a is not detected. Therefore, control gain Ga at gain adjustment section 56 is set to "1" and this control gain Ga is supplied to multiplier 56d. Straightness securing control value δa is directly supplied to adder 56e to be added to zero target steering angle δ*. Hence, post-addition target steering angle δ*a in accordance with external disturbance compensation value Adis is calculated and the steering angle of steering actuator 8a of actuator 8 is controlled to be made coincident with post-addition target steering angle δ*a. Thus, the straight running which eliminates the influence of the external disturbances can be carried out.

Hence, in a case where, due to a stepwise difference of the road surface, mutually different road surface frictional coefficients of front road wheels 17FR, 17FL, and so forth, front road wheels 17FR, 17FL are steered in response to the external disturbances through the input from the road surface, steering actuator 8 is rotated. Rotational angle θmo detected by means of steering actuator rotational angle sensor 9 in accordance with the input from the road surface is varied and external disturbance compensation value Adis is outputted in accordance with the variation in this rotational angle θmo.

Therefore, steering actuator 8 is controlled in accordance with external disturbance compensation value Adis so that the torque against the steering due to the road surface input of suspension unit 1B can be generated. Hence, the straightness of suspension unit 1B can be secured by straightness securing section SG.

In addition, in a case where the external disturbances are not detected by external disturbance compensation section 54 in the vehicle straight running state, straightness securing control value δa calculated by straightness securing section SG gives zero and target steering angle δ* outputted from target steering angle calculation section 51 gives zero. Consequently, post-addition target steering angle δ*a outputted from adder 56e also gives zero.

Therefore, if a steering angular displacement occurs in steering motor 8a constituting steering actuator 8, motor current imr is outputted from actuator control apparatus 63 to eliminate this steering angular displacement.

Hence, steerable wheels 17FR, 17FL are returned to the steering angle in the straight running state. Hence, the straightness ca be secured by means of actuator control apparatus 63.

However, when steering wheel 2 is in a state of a right (or left) turn from a state in which steering wheel 2 is in the straightness running state at which steering wheel 2 is held in the neutral position, a transition of the steering state due to the steering from the straight running state to the steering (turning) state is detected by steering start detection section 56a.

Therefore, a control delay signal is outputted to gain adjustment section 56c from mono-stable circuit 56b to maintain the on state for the predetermined time, for example, 0.1 seconds. Hence, gain adjustment section 56c sets control gain Ga to "0" while a control delay signal maintains the on state. Thus, the multiplied output outputted from multiplier 56d indicates "0". The output of adder 56e to straightness securing control value δa is stopped.

Figure 25A:
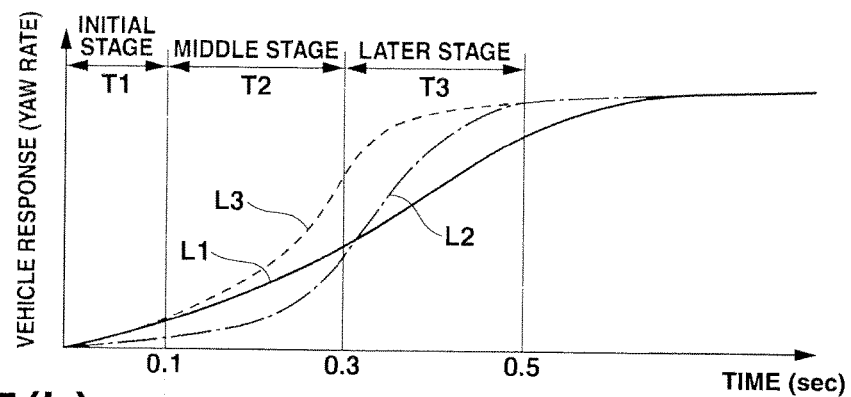
FIGS. 25(a) and 25(b) are graphs representing steering response characteristics, FIG. 25(a) being the graph representing a variation in the response characteristic of the vehicle and FIG. 25(b) being the graph representing a switch timing of a control characteristic.
Figure 25B:
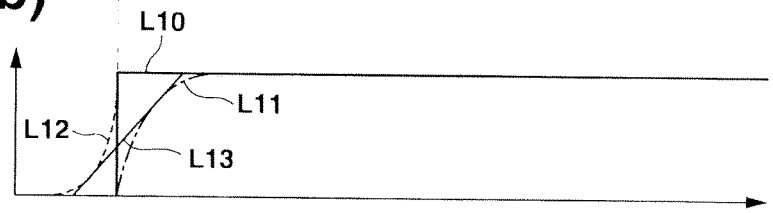

Hence, for a time duration of an initial stage response (time) interval T1 of 0.1 seconds from a time point at which the steering is started from the neutral position of steering wheel 2, control gain Ga is set to "0" and, thus, the multiplied output outputted from multiplier 56d is set to "0" so that the straightness securing control for target steering angle δ* is stopped as denoted by a solid line in FIG. 25(b).

Therefore, steering angle θs detected by steering angle sensor 4 is supplied to target steering angle calculation section 51 and target steering angle δ* calculated by this target steering angle calculation section 51 is directly supplied to actual steering wheel deviation calculation section 58. Hence, steering motor 8a is rotationally driven so that the steering angle is made coincident with target steering angle δ*.

During this time duration, the straightness securing control by means of straightness securing section SG is stopped.

Hence, during initial stage response interval T1, the steering by means of suspension unit 1B in which the road surface contact point of kingpin axis KS is set on the road surface contact center position within the road surface contact area of the tire and the caster angle is set to zero is started.

Figure 24A:
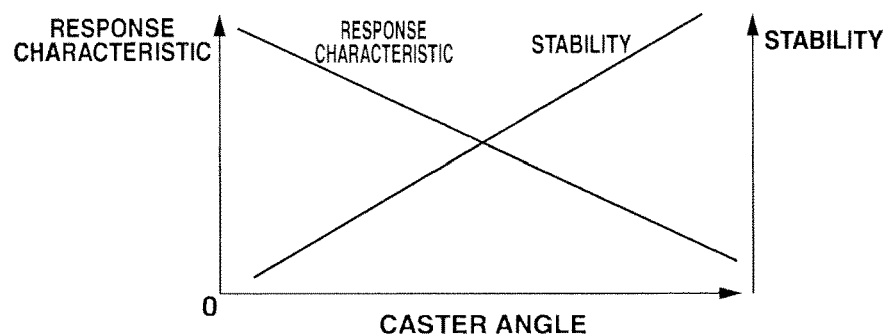
FIGS. 24(a) and 24(b) are views representing characteristics of the suspension unit, FIG. 24(a) being the graph representing a relationship among the canister angle, the response characteristic, and the stability and FIG. 24(b) being the view representing a relationship among canister trail, the lateral force reduction margin, and the straightness.
Figure 24B:
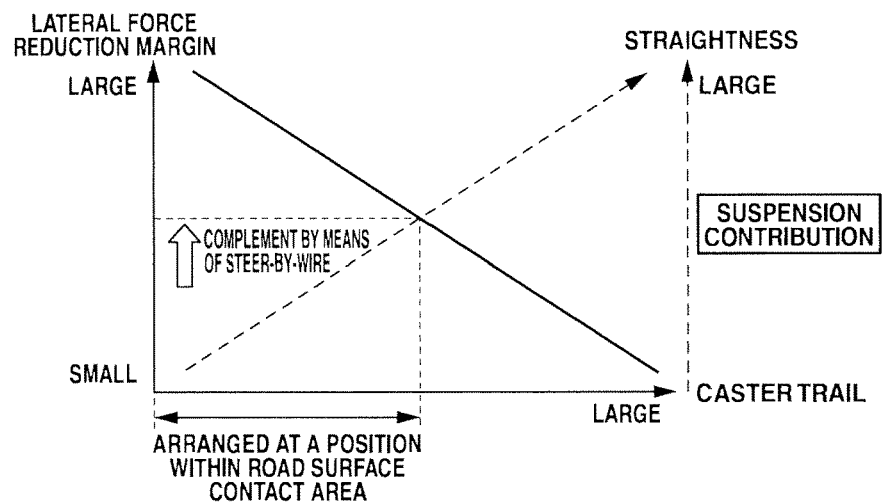

At this time, the caster angle of suspension unit 1B is set to zero. The relationship among the caster angle, the steering response characteristic, and the (steering or maneuverability) stability is such that, as shown in FIG. 24(a), while the steering response characteristic indicates high when the caster angle is zero and the stability cannot be secured. That is to say, a trade-off relationship between the steering response characteristic with respect to the caster angle and the stability with respect to the caster angle is present.

Therefore, in an initial state at which the steering is started from the neutral position, the straightness securing control according to the steer-by-wire control is not executed and this initial stage steering is covered by suspension unit 1B.

At this initial stage response interval T1, suspension unit 1B whose caster angle is set to zero and whose steering response characteristic is high, as described above, can provide a higher steering response characteristic (yaw rate) as denoted by a characteristic line L1 in the solid line in FIG. 25(a) than the steering response characteristic (yaw rate) in a vehicle having a steering system of a general purpose steer-by-wire system shown in a characteristic line L2 denoted by a dot-and-dash line in FIG. 25(a).

At this time, since a steering angle variation is such as to correspond to the steering angle variation due to the steering of the vehicle driver through steering wheel 2, no unpleasant (unmatched) feeling is given to the vehicle driver.

However, the steering is continued exceeding initial stage response interval T1 only with the steering response characteristic that suspension unit 1B has. In this case, as a characteristic line L3 denoted by a broken line L3 in FIG. 25(a), a vehicle steering response characteristic due to the steering at a middle stage response interval T2 and at a later stage response interval T3 becomes sensitized. In addition, a vehicle entrainment phenomenon toward an inside of the vehicle from the middle stage response interval T2 to the later stage response interval T3 becomes large.

Therefore, in the third embodiment, as shown in FIG. 25(b), the straightness securing control by means of straightness securing section SG for target steering angle δ* is started in a stepwise manner, straightness securing section SG constituting target steering angle control section 52, straightness complement section 53, and external disturbance compensation section 54, after a time interval of, for example, 0.1 seconds at which initial stage response interval T1 has elapsed, as shown in FIG. 25(b). Therefore, the vehicle steering response characteristic through suspension unit 1B is suppressed to suppress a fluctuation of the vehicle and the straightness of suspension unit 1B is complemented by the steer-by-wire system so as to be enabled to secure the maneuverability and stability.

Thereafter, after the time duration, for example, 0.3 seconds has elapsed at which middle stage response interval T2 is ended, the steering response characteristic is more strongly suppressed according to the straightness securing control by means of straightness securing section SG, as compared with a general vehicle steering response characteristic so that an understeer tendency can be provided. Thus, as shown by characteristic line L1 denoted by the solid line in FIG. 25(a), the maneuverability and stability can be improved and an ideal vehicle steering response characteristic denoted by characteristic line L1 can be realized.

As described above, according to the steering system of the vehicle in this embodiment, the caster trail is set within the tire (road surface) contact area in suspension unit 1B. Hence, the moment around kingpin axis KS can be made smaller.

Hence, since, even in the third embodiment, the steering can be carried out with the smaller rack axial force and the direction (orientation) of the road wheels can be controlled with the smaller force, the steering response characteristic can be improved.

As described above, since, in the above-described third embodiment, the steering response characteristic that suspension unit 1B itself has is improved by setting at least kingpin axis KS to pass within the (road surface) contact area of the tire and, in this addition, the steering angle control, the straightness complement, and the external disturbance compensation are carried out by means of straightness securing section SG of steer-by-wire system SS to secure the straightness of suspension unit 1B.

Therefore, in a case where the leftward or rightward steering is carried out from a state in which steering wheel 2 is held at the neutral position, the high response characteristic is secured utilizing a high steering response characteristic of suspension unit 1B itself at initial stage response interval T1. Thereafter, when the response interval enters middle stage response interval T2 after the lapse of initial stage response interval T1, it is necessary to place a more importance on the stability than placing the importance on the steering response characteristic. Since control gain Ga is set to "1" by gain adjustment section 56c of delay control section 56 in steer-by-wire system SBW. Thus, the straightness securing control using straightness securing control value δa calculated by straightness securing section SG is started.

Therefore, the straightness securing control such as the steering angle control, the straightness complement, the external disturbance compensation, and so forth is started so that the stability is secured suppressing the high steering response characteristic by means of suspension unit 1B. Furthermore, at later stage response interval T3, the steering response characteristic is furthermore reduced to suppress the vehicle entrainment phenomenon toward the inside of the vehicle, the vehicle is provided with the understeer tendency, and the fluctuation of the vehicle is furthermore suppressed so that the ideal steering response characteristic control can be established.

Furthermore, steering angle control section 52 is installed to enable the straightness securing control with the displacements (variation quantities) of steerable wheels 17FL, 17FR due to the compliance steer taken into consideration. Thus, it is possible to set rigidities of the bushes inserted between the vehicle body 1A side supporting sections of first link 37 and second link 38 which are the lower link member to be weak (small) and a comfortableness of the vehicle can be improved by reducing a vibration transmission rate from the road surface to vehicle body 1A through first link 37 and second link 38.

It should be noted that, in the third embodiment, steering control apparatus 50 is constituted by a hardware. However, the present invention is not limited to this. For example, target steering angle calculation section 51 and straightness securing section SG is constituted by an arithmetic processing unit such as a microcomputer and this arithmetic processing unit may execute the steering control process shown in FIG. 26.

Figure 26:
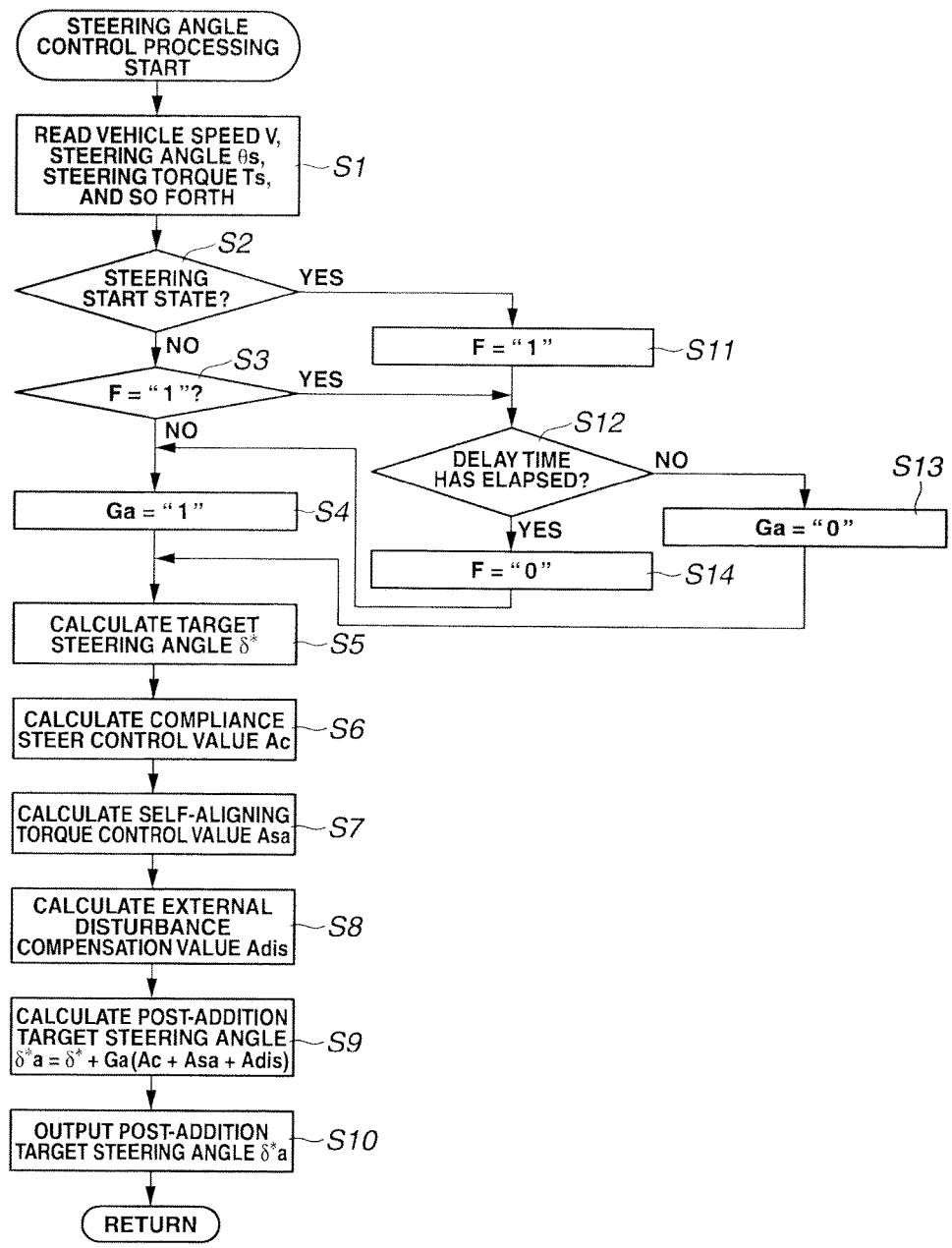
FIG. 26 is a flowchart representing an example of a steering angle control process.

This steering control process is shown in FIG. 26. That is to say, at first, at a step S1, the arithmetic processing unit reads necessary data required for the arithmetic processing such as vehicle speed V, steering angle θs detected by steering angle sensor 4, rotational angle θmo detected by actuator rotational angle sensor 9, driving forces TL, TR of the left and right road wheels of driving force control apparatus 71, steering torque Ts detected by torque sensor 5, and so forth. Next, at a step S2, the arithmetic processing unit determines whether the present state is the steering start state in which steering wheel 2 is right or left steered from the state in which steering wheel 2 is held in the neutral position on a basis of steering angle θs detected by steering angle sensor 4. If not in the steering start state, the routine goes to a step S3.

At this step S3, the arithmetic processing unit determines whether a control flag F representing that the present time (state) is the steering start control state is set to "1". If control flag F is reset to "0", the routine goes to a step S4 at which control gain Ga is set to "1" and the routine goes to a step S5. At step S5, target steering angle δ* is calculated on a basis of vehicle speed V and steering angle θs in the same way as above-described target steering angle calculation section 51.

Next, the routine goes to a step S6. In the same way as steering angle control section 52, compliance steer coefficient sf is multiplied by left and right road wheel driving forces TL, TR to calculate displacements (variation quantities) Δfl, Δfr of steerable wheels 17FL, 17FR and compliance steer control value Ac is calculated on a basis of these data of the displacements.

Next, the routine goes to a step S7. In the same way as straightness complement section 53, by referring to the generation torque estimation control map shown in FIG. 12 on a basis of a driving force difference ΔT (=TL−TR) of leftward and rightward road wheel driving forces TL, TR, generation torque Th which is generated during the steering operation due to the torque steer phenomenon. Then, self-aligning torque Tsa is calculated by subtracting this generation torque Th from steering torque Ts and self-aligning torque control value Asa is calculated by multiplying this self-aligning torque Tsa by a predetermined gain Ksa.

Next, the routine goes to a step S8. At step S8, the arithmetic processing unit estimates the external disturbances which are inputted to the vehicle and are separated for the respective frequency bands on a basis of motor rotational angle θmo from steering actuator rotational angle sensor 9, steering torque Ts, and motor current imr detected by motor current detection section 61 and calculates external disturbance compensation values Adis to suppress these external disturbances.

Next, the routine goes to a step S9. At step S9, post-addition target steering angle δ*a is calculated by the following equation (3) on a basis of target steering angle δ*, compliance steer control value Ac, self-aligning torque control value Asa, and external disturbance compensation value Adis.

$$\delta^*a = \delta^* + Ga(Ac + Asa + Adis) \quad (3)$$

Next, the routine goes to a step S10. After the output of post-addition target steering angle δ*a calculated at step S9 to steering angle deviation calculation section 58 in FIG. 22, the routine returns to step S1.

In addition, if the result of determination at step S2 is the steering start state (Yes), the routine goes to a step S11 at which control flag F is set to "1" and the routine goes to a step S12. Furthermore, the result of determination at step S3 is such that control flag F is set to "1", the routine goes directly to step S12.

At step S12, the arithmetic processing unit determines whether a preset delay time (for example, 0.1 seconds) has elapsed. At this time, if the preset delay time has not elapsed, the routine goes to a step S13. At step S13, control gain Ga is set to "0" and the routine goes to step S5 to calculate target steering angle δ*. If the result of determination at step S12 indicates that the preset delay time (for example, 0.1 seconds) has elapsed, the routine goes to a step S14. At step S14, control flag F is reset to "0" and the routine goes to step S4 at which control gain Ga is set to "1".

Even in the steering command angle calculation process shown in FIG. 26, when the present state is not the steering start state in which the steering toward the rightward direction or leftward direction is carried out from the state in which steering wheel 2 is held at the neutral position, the straightness securing control such that straightness securing control value δa which is the addition of compliance steer control value Ac, self-aligning torque control value Asa, and external disturbance compensation value Adis is added to target steering angle δ* is carried out.

Whereas, when the present state is the steering start state in which the steering to the rightward direction or leftward direction is carried out from the state in which steering wheel 2 is held at the neutral position, control gain Ga is set to "0" until the preset delay time has elapsed. Hence, the straightness securing control is stopped. Therefore, only target steering angle δ* is outputted to steering angle deviation calculation section 58. Consequently, steering motor 8a constituting steering actuator 8 is rotationally driven. Therefore, the high steering response characteristic of the suspension unit itself is set as the initial stage steering response characteristic so that a high steering response characteristic can be achieved.

Thereafter, if the delay time has elapsed, control gain Ga is set to "1". Hence, steering motor 8a constituting steering actuator 8 is rotationally driven according to a value of straightness securing control value δa to which compliance steer control value Ac, self-aligning torque control value Asa, and external disturbance compensation value Adis are added and which is added to target steering angle δ*. Hence, the high response characteristic of suspension unit 1B is suppressed and the straightness of suspension unit 1B is held so that the ideal steering response characteristic can be achieved.

Even in this steering control process, target steering angle δ* indicates zero in the vehicle straight running state and, if no external disturbance is generated, this target steering angle δ* is directly supplied to steering angle deviation calculation section 58 shown in FIG. 22. Hence, the straightness is secured by means of actuator control apparatus 63 in the same way as described before.

In the processing shown in FIG. 26, the process at step S5 corresponds to target steering angle calculation section 51, the process at step S7 corresponds to straightness complement section 53, the processes at step S5, S6, S7 correspond to straightness securing section SG, steps S2, S3, S4 and steps S11, S12, S13, S14 correspond to delay control section 56, and the processes at steps S2 through S14 correspond to steering response characteristic setting section SRS.

In addition, in the above-described third embodiment, straightness securing section SG is constituted by steering angle control section 52, straightness complement section 53, and external disturbance compensation section 54. However, the present invention is not limited to this. Any one or two of steering angle control section 52, straightness complement section 53, and external disturbance compensation section 54 may be omitted.

(Effect of the Third Embodiment)

(1) In the third embodiment, the vehicle includes: the steering control apparatus which actuates the actuator in accordance with the steering state of the steering wheel to steer the steerable wheels; and the suspension unit which supports the steerable wheels on the vehicle body. The suspension unit is set such that the road surface contact point of the kingpin axis is positioned within the contact area of the tire when the steering wheel is placed at the neutral position. In addition, the above-described steering control section includes the straightness securing section which secures the straightness of the suspension unit.

Thus, the moment around the kingpin axis of the suspension unit can furthermore be reduced. Thus, with the smaller rack axial force, the steering can be carried out and the direction (orientation) of the road wheels can be controlled with the smaller force.

Hence, the steering response characteristic can be improved. At this time, since the caster angle is set to provide a value in proximity of zero so that the suspension unit having a higher steering response characteristic can be structured.

Then, the reduction of the straightness due to the securing of the steering response characteristic of the suspension unit can be secured (covered) by means of the straightness securing section.

In addition, since the steer-by-wire system constitutes the straightness securing section having the steering actuator and the actuator control apparatus, it is not necessary to dispose independently the straightness securing section. Then, the structure can be simplified.

In addition, as straightness securing section, straightness securing section SG of steering response characteristic setting section SRS serves as the main straightness securing section and actuator control apparatus 63 serves as the sub straightness securing section. Hence, both of the straightness securing sections can accurately secure the straightness of the suspension unit.

When the steering wheel is rightward or leftward steered from the state in which the steering wheel is held at the neutral position, the straightness securing control of the straightness securing section is delayed by means of the delay control section. Hence, the high response characteristic is secured by covering the initial stage response characteristic with the steering response characteristic of the suspension unit itself. Thereafter, the steering response characteristic of the suspension unit itself is adjusted by the straightness securing control by means of the straightness securing section so that the ideal steering response characteristic can be secured.

(2) The straightness securing section performs displacement corrections for the steerable wheels by estimating at least the compliance steer.

Hence, it is possible to reduce the rigidities of the bushes inserted between the vehicle body side supporting sections of the lower arms constituting the suspension unit so that a comfortableness of the vehicle can be improved.

(3) The straightness securing section secures the straightness by calculating the self-aligning torque.

Hence, since the high response characteristic of the suspension unit is secured in the straightness securing section, the reduced straightness can be secured by the self-aligning torque and the maneuverability and stability can be improved.

(4) When the steering through the steering wheel is started from the neutral position of the steering wheel, the steering response characteristic setting section of the steer-by-wire system sets the steering response characteristic that the suspension unit itself has as the initial stage steering response characteristic at the initial stage of the steering start and such a control through the steering actuator to secure the straightness of the suspension unit itself is started by means of the straightness securing section of the steer-by-wire system after the passage of the initial stage setting time.

Thus, the high steering response characteristic of the suspension unit at the initial stage of the steering start can be secured and the control through the steering actuator to secure the straightness of the suspension unit itself can be carried out by the straightness securing section after the passage of the initial stage setting time so that the ideal steering response characteristic can be obtained.

(4)' The above-described steering response characteristic setting section sets the high steering response characteristic which is the steering response characteristic of the suspension unit itself, at the initial stage steering state, when the steering wheel is steered from the neutral position of the steering wheel, and sets the required steering response characteristic according to the straightness securing control by means of the straightness securing section, when the present state is the steering state after the initial stage steering state.

Hence, the suspension unit can provide the high steering response characteristic and the straightness of the suspension unit is secured by the straightness securing section. Thus, the ideal steering response characteristic can be secured.

(5) The above-described steering response characteristic setting section is provided with the delay control section which delays the start of the straightness securing control by means of the above-described straightness securing section, when the steering through the steering wheel is started from the neutral position of the steering wheel.

Therefore, since the delay control section delays the start of the straightness securing control by means of the straightness securing section, the initial stage steering response characteristic can indicate the high steering response characteristic that the suspension unit itself has.

(5)' The above-described delay control section is provided with the gain adjustment section which adjusts the start of the straightness securing control by means of the above-described straightness securing section.

Thus, the gain adjustment section sets, for example, the gain for the straightness securing control value in the straightness securing control to "0" not to carry out the straightness securing control and sets the gain to a value larger than "0", for example, to "1" to be enabled to start the straightness securing control. Therefore, due to the provision of the gain adjustment section, the adjustment of the start of the straightness securing control can be facilitated.

(6) The above-described delay control section starts the straightness securing control through the straightness securing section after 0.1 second delay from the steering start timing at which the rightward or leftward steering is carried out from the state in which the steering wheel is held at the neutral position.

Hence, the initial stage steering response characteristic can effectively utilize the high steering response characteristic that the suspension unit itself has and the straightness securing control by means of the above-described straightness securing section is started after the initial stage interval of 0.1 second delay. Thus, the ideal steering response characteristic can be obtained.

(7) The above-described delay control section starts the straightness securing control in the stepwise manner in a case where the straightness securing control by means of the straightness securing section is started.

Therefore, the steering response characteristic can be adjusted according to the steering angle control and the straightness complement immediately carried out at the time point of the control start.

(8) The above-described delay control section gradually starts the above-described straightness securing control in a case where the straightness securing control by means of the straightness securing section is started. Therefore, a variation in the steering response characteristic at the time point of the control start is smoothed so that a sense of feeling different from an actual steering sense given to the vehicle driver can be suppressed.

(9) The above-described steering control apparatus includes: the target steering angle calculation section which calculates the target steering angle in accordance with the steering angle; the adder which adds the target steering angle calculated by the target steering angle calculation section to the straightness securing control value of the straightness securing section; the steering motor control section which forms the motor command current to make the addition output of the adder with the rotational angle of the steering motor constituting the actuator; and the current control section which forms the motor drive current supplied to the steering motor which is coincident with the motor command current.

Hence, the target steering angle calculation section calculates the target steering angle which accords with the steering angle of the steering wheel, adds the straightness securing control value to the target steering angle by means of the adder, forms the target motor current which makes the addition output of the adder coincident with the rotational angle of the steering motor constituting the actuator, forms the motor drive current which is made coincident with the target motor command current at the motor current control section, and outputs this motor drive current to the steering motor. Thus, the driving control of the steering motor can be carried out in accordance with the steering angle of the steering wheel. Since the target steering angle outputted from the target steering angle calculation section is adjusted by the steering response characteristic setting section so that an optimum steering control can be achieved.

(10) The caster trail of the kingpin axis passing through the upper pivot point and the lower pivot point of the above-described link member is positioned within the tire contact area.

Therefore, the moment around the kingpin axis can be made smaller. Thus, the steering can be made with the smaller rack axial force and the direction (orientation) of the road wheels can be controlled with the smaller force.

(11) The suspension unit for the vehicle according to the present invention can be applied to the strut suspension mechanism.

Therefore, a smaller number of parts can be achieved and the settings of the kingpin axis according to the present invention can be facilitated.

(12) When the steering wheel is steered from the neutral position, the high steering response characteristic that the suspension unit itself has is set as the initial stage steering response characteristic, at the initial stage of the steering start and the steering response characteristic of the suspension unit itself is adjusted to the required steering response characteristic through the straightness securing control of the straightness securing section after the elapse of the initial stage setting time.

Therefore, when the steering wheel is steered from the neutral position, the high steering response characteristic of the suspension unit and the adjustment of the steering response characteristic by means of the straightness securing control of the straightness securing section can obtain the ideal steering response characteristic.

(Modifications of Third Preferred Embodiment)

Figure 27:
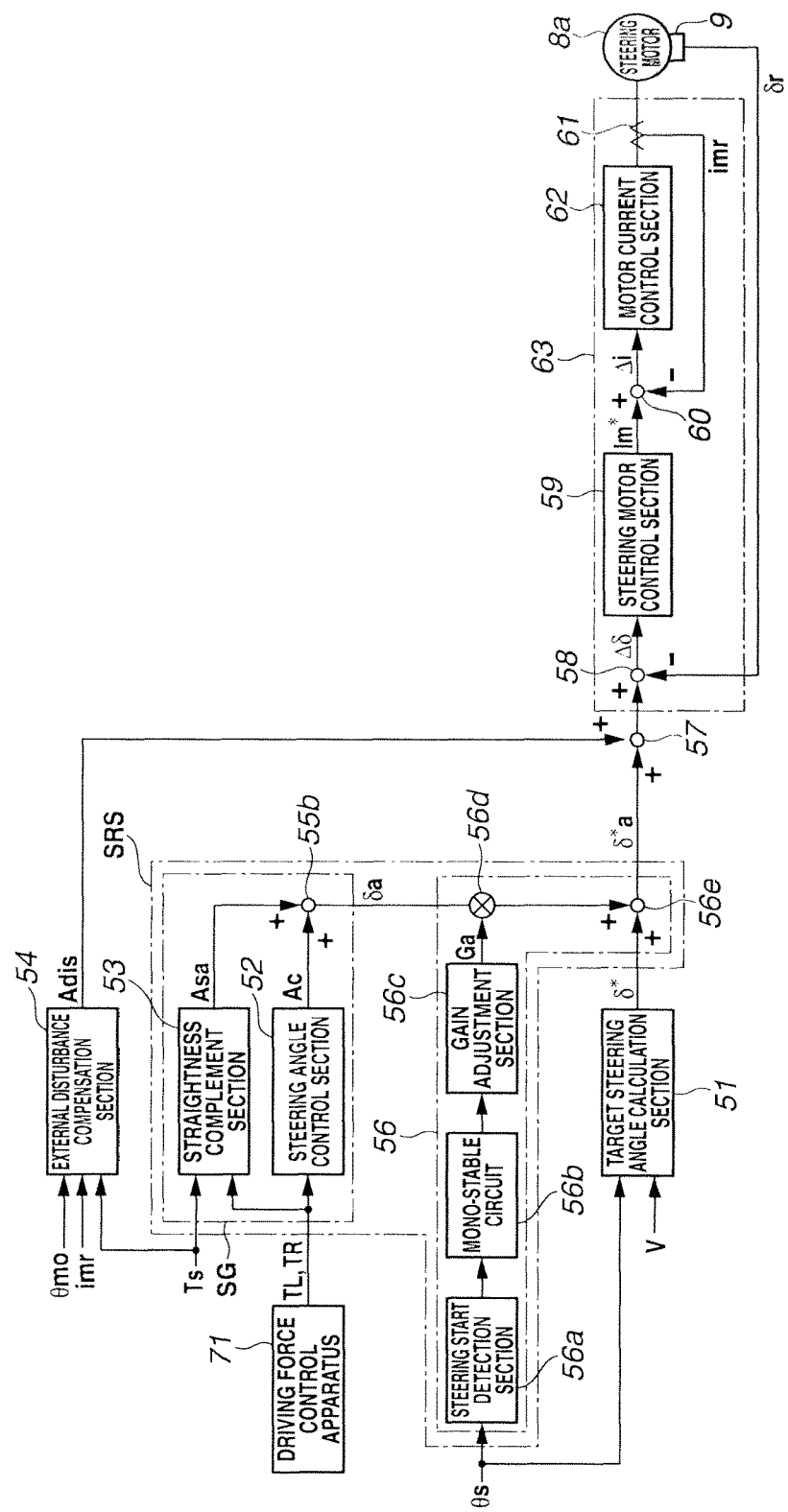
FIG. 27 is a block diagram representing a variation of a steering control section in the third preferred embodiment.

It should be noted that, in the above-described third embodiment, external disturbance compensation section 54 is installed in straightness securing section SG. However, the present invention is not limited to this. As shown in FIG. 27, external disturbance compensation section 54 is installed so as to be independent of straightness securing section SG. Then, external disturbance compensation value Adis outputted from this external disturbance compensation section 54 may be added by adder 57 to post-addition target steering angle δ*a outputted from adder 56e. In this case, since the external disturbance compensation value Adis is, at all times, added to target steering angle δ*, the influence of the external disturbance can, at all times, be suppressed independently of (or irrespective of) the steering start state.

In addition, in the above-described third embodiment, straightness securing section SG is constituted by steering angle control section 52, straightness complement section 53, and external disturbance compensation section 54, in a state in which the steering start state in which the rightward and leftward steering is started from the state in which the steering wheel is maintained at the neutral state, target steering angle δ* is directly inputted to steering angle deviation calculation section 58 without carrying out the straightness securing control in which straightness securing control value δa is added to target steering angle δ* during initial stage response interval T1.

However, the present invention is not limited to this. In the steering start state in which the rightward or leftward steering is started from the state in which the neutral state is maintained, a rotational angle difference often occurs between steering angle θs detected by steering angle sensor 4 and rotational angle θmo detected by steering actuator rotational angle sensor 9. In this case, it is preferable to generate a torque at steering actuator 8 compensating the rotational angle difference between steering angle θs and rotational angle θmo.

Figure 28:
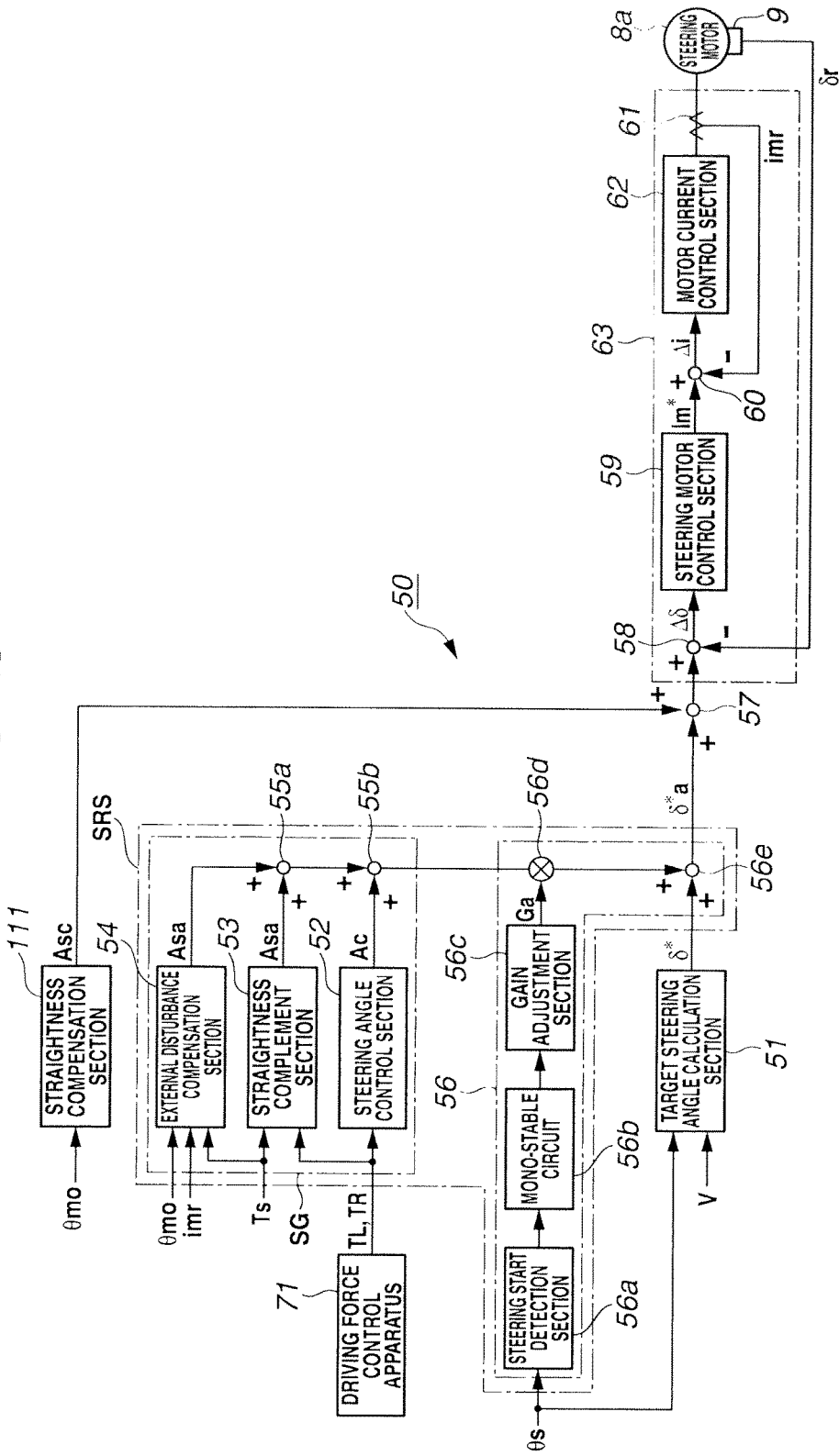
FIG. 28 is a block diagram representing another variation of the steering control section in the third preferred embodiment.

To achieve the above-described matter, a straightness compensation section 111 may preferably be installed which is independent of straightness securing section SG, as shown in FIG. 28. A straightness compensation value Asc outputted from this straightness compensation section 111 is added to post-addition target steering angle δ*a outputted from adder 56e by adder 57.

It should be noted that, as a structure of straightness compensation section 111, the actual steering angle is calculated on a basis of rotational angle θmo of steering actuator 8 detected by steering actuator rotational angle sensor 9 and straightness compensation value Asc in accordance with the actual steering angle is calculated by referring to a control map representing a relationship between a preset actual steering angle and straightness compensation value Asc on a basis of the calculated actual steering angle.

In addition, as another structure of the straightness compensation section 111, the rack axial force of rack axle 14 is detected by a rack axial force sensor such as a strain gauge or the rack axial force is estimated and straightness compensation value Asc is calculated by referring to the control map representing the relationship between a preset rack axial force and straightness compensation value Asc.

Furthermore, as a still another structure of straightness compensation value 111, the actual steering angle is calculated on a basis of rotational angle θmo of steering actuator 8 detected by steering actuator rotational angle sensor 9 and, in a case where the calculated actual steering angle is within a range equal to or below a predetermined value with the neutral position as a center, a preset constant value straightness compensation value Asc is added to post-addition target steering angle δ*a by adder 57.

In addition, in the above-described third embodiment, the explanation in a case where the straightness securing control in which straightness securing control value δa is added to target steering angle δ* at a time point at which the initial stage interval is ended is immediately started with characteristic line L10 in the stepwise manner has been made. However, the present invention is not limited to this. As shown by a characteristic line L11 denoted by a dot-and-dash line in FIG. 25(b), straightness securing control value δa may gradually be increased after the passage of the initial stage interval to start the corrective process. In addition, as shown by a characteristic line L12 in FIG. 25(b), straightness securing control value δa may gradually be increased before the end of the initial stage interval. Furthermore, as shown by a characteristic line L13 which is linear having a predetermined gradient in FIG. 25(b), the straightness securing control value may gradually be increased.

In order to vary the gradients of these characteristic lines, control gain Ga is varied together with the elapse of time to enable the adjustment of the gradients of the characteristic lines in place of the case of the settings of control gain Ga at gain adjustment section 56c to "0" and "1".

In addition, in the above-described third embodiment, control gain Ga is set to "0" during initial stage interval T1 by gain adjustment section 56c of delay control section 56 in a state in which the steering is started from the state in which steering wheel 2 maintains the neutral position and, during the other intervals, control gain Ga is set to "1". However, the present invention is not limited to this. Control gain Ga is set to "0" during initial stage interval T1, control gain Ga during middle stage interval T2 and later stage interval T3 after the passage of initial stage interval T1 is set to, for example, "0.8" and control gain Ga is set to "1" at the other stage intervals so that an aspect of the straightness securing control of suspension unit 1B can be varied in accordance with the traveling state of the vehicle.

(Fourth Embodiment)

Next, a fourth preferred embodiment according to the present invention will be explained with reference to FIG. 29.

In the fourth embodiment, the structure of delay control section 56 in the third embodiment is modified.

Figure 29:
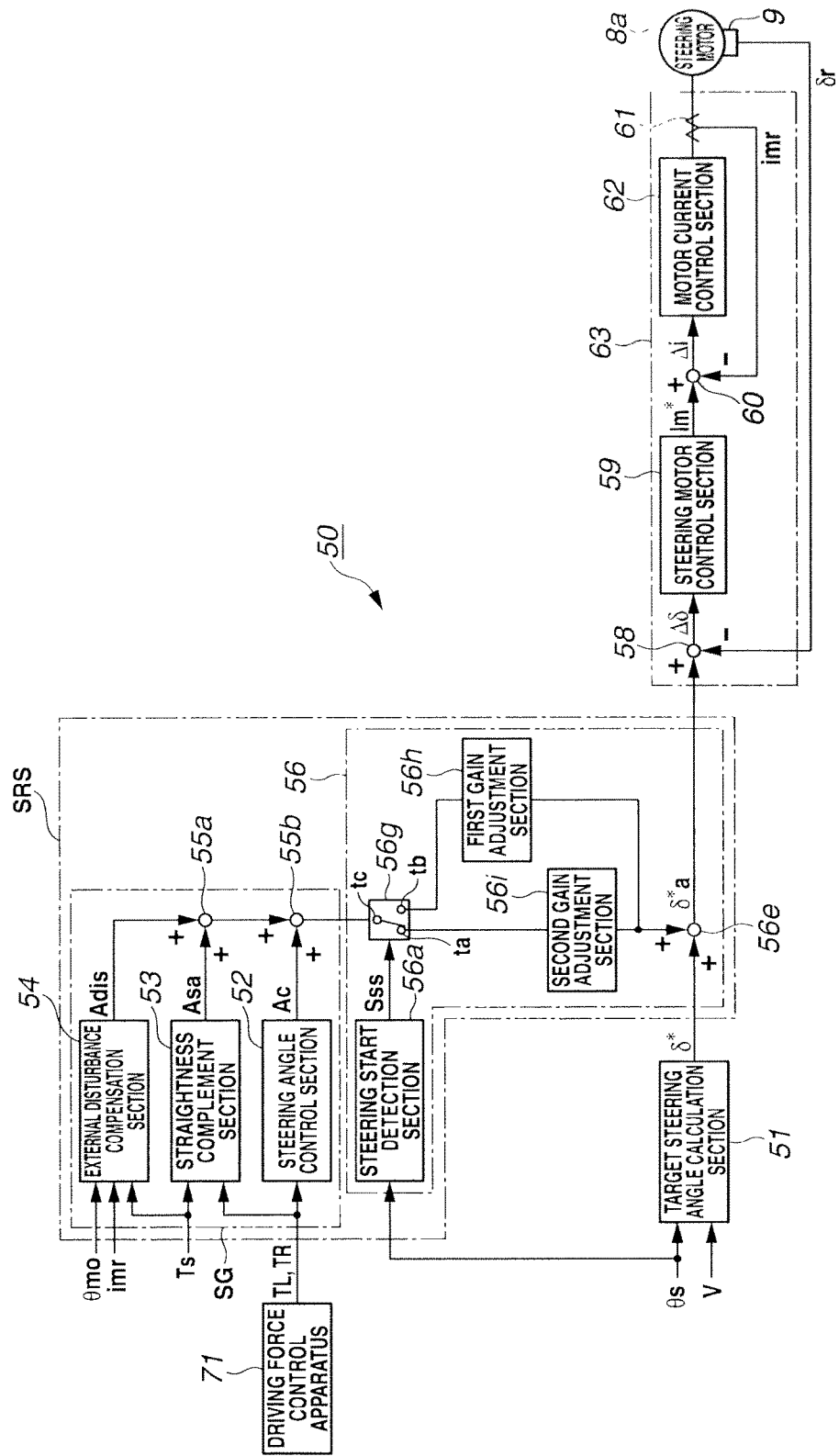
FIG. 29 is a block diagram representing the steering control section in a fourth preferred embodiment according to the present invention.

That is to say, in the fourth embodiment, delay control section 56 is structured as shown in FIG. 29. This delay control section 56 includes: steering start detection section 56a; adder 56e; a selection section 56g; a first gain adjustment section 56h; and a second gain adjustment section 56i.

It should, herein, be noted that steering start detection section 56a outputs a steering start detection signal Sss which is in the on state during a time duration from a time point at which the rightward or leftward steering is started from a state in which the neutral state of steering wheel 2 is maintained for a predetermined time to a degree such that, for example, the straight running state can be judged to a time point at which a state in which the subsequent neutral position is detected, on a basis of steering angle θs detected by steering angle sensor 4, to a selection section 56g.

Selection section 56g includes a normally closed fixture terminal ta, normally open fixture terminal tb, and a movable terminal tc to select these fixture terminals ta and tb. Movable terminal tc inputs straightness securing control value δa outputted from straightness securing section SG. Normally closed fixture terminal ta is connected to an adder 56e via second gain adjustment section 56i. Normally open fixture terminal tb is connected to adder 56e via first gain adjustment section 56h.

Then, when movable terminal tc of selection section 56g selects normally open fixture terminal ta when steering start detection signal Sss outputted from steering start detection section 56a is in the off state. In addition, selection section 56g selects normally open fixture terminal tb when steering start detection signal Sss is in the on state.

First gain adjustment section 56h stops the straightness securing control with respect to target steering angle δ* for a predetermined time corresponding to a preset initial stage response interval T1 described before, for example, 0.1 seconds when straightness securing control value δa is inputted thereto via selection section 56g. That is to say, gain adjustment section 56h stops the output of straightness securing control value δa for initial stage response interval T1 at a first, for example, 0.1 second interval (namely, this corresponds to a case where gain Ga is set to "0" in the third embodiment). In addition, first gain adjustment section 56h multiplies the control gain of, for example, "0.8" with straightness securing control value δa after the passage of initial stage response interval T1 and outputs the multiplied result to adder 56e (namely, this approximately corresponds to a state in which control gain Ga in the third embodiment is set to "1").

In addition, second gain adjustment section 56i multiplies control gain of, for example, "1" with straightness securing control valve δa to secure the sufficient straightness at a time of the straight run. It should, herein, be noted that the gains set at first gain adjustment section 56h and at second gain adjustment section 56i are not limited to the range from 0 to 1 but can be set to arbitrary values in accordance with the characteristic of suspension unit 1B.

Hence, delay control section 56 does not detect the steering start from the neutral state when the steering of steering wheel 2 is continued. Hence, straightness securing control value δa calculated in straightness securing section SG by means of selection section 56g is supplied to second gain adjustment section 56i. Therefore, the control gain of "1" is multiplied with straightness securing control value δa and, thus, the straightness securing control value δa is directly supplied to adder 56e. Therefore, a favorable straightness securing control is carried out by adding straightness securing control value δa to target steering angle δ*.

On the other hand, when the steering start from the neutral state is detected by means of steering start detection section 56a, selection section 56g switches for movable terminal 5c to normally open fixture terminal tb so that straightness securing control value δa is supplied to gain adjustment section 56h. Therefore, during an initial stage response period T1 (for example, 0.1 seconds), the output of straightness securing control value δa to adder 56e is stopped. Therefore, the start of straightness securing control by means of straightness securing control value δa with respect to target steering angle δ* is delayed. Thereafter, gain adjustment section 56h sets control gain Ga to "0.8" after the passage of the predetermined time so that straightness securing control value δa is slightly suppressed and this slightly suppressed value is added to target steering angle δ*. Therefore, the straightness securing control to target steering angle δ* is started and, while the fluctuation generated on suspension unit 1B is suppressed, the ideal steering response characteristic can be obtained.

Thereafter, when steering wheel 2 is returned to the neutral position, steering start detection signal Sss outputted from steering start detection section 56a is in an off state. Therefore, selection section 56g is switched for movable terminal tc to be returned toward normally closed fixture terminal to so that straightness securing control value δa calculated by straightness securing section SG is supplied to second gain adjustment section 56i and straightness securing control value δa is directly supplied to adder 56e. Hence, a favorable straightness securing control to target steering angle δ* is continued.

(Effect of Fourth Embodiment)

In this way, in the fourth embodiment, when the steering to turn steering wheel 2 toward the rightward or leftward direction from the state in which steering wheel 2 is maintained at the neutral state, the output of straightness securing control value δa for, for example, 0.1 seconds namely, during initial stage response interval T1 to adder 56e is stopped by means of first gain adjustment section 56h. Thereafter, the output of straightness securing control value δa after the passage of initial stage response interval T1 to adder 56e is started. Therefore, the same action and advantage as the third embodiment described before can be obtained.

In addition, since, when steering wheel 2 is returned to the neutral position, steering start detection signal Sss outputted from steering start detection section 56a is returned to the off state, straightness securing control value δa itself indicates a small value even if, in this state, movable terminal tc of selection section 56g is returned to normally closed fixture terminal to side.

Thus, the value of straightness securing control is not discontinuous and a smooth switching of the straightness securing control value can be performed.

(Modification of Fourth Embodiment)

It should be noted that, in the above-described fourth embodiment, steering start detection signal Sss is turned to the on state from the detection of the steering start by steering start detection section 56a to the detection of the neutral state of steering wheel 2 by steering start detection section 56a has been explained. However, the present invention is not limited to this. When the steering start state is detected by means of steering start detection section 56a, in the same way as the third embodiment described before, the pulse shaped steering start signal Sss is outputted. In this case, the mono-stable circuit is inserted between steering start detection section 56a which is in the on state from the time point at which the steering start is detected to selection section 56g. Thus, movable terminal tc of selection section 56g may be switched to normally open fixture terminal tb side.

In addition, in the above-described fourth embodiment, steering control apparatus 50 is constituted by a hardware. The present invention is not limited to this.

Figure 30:
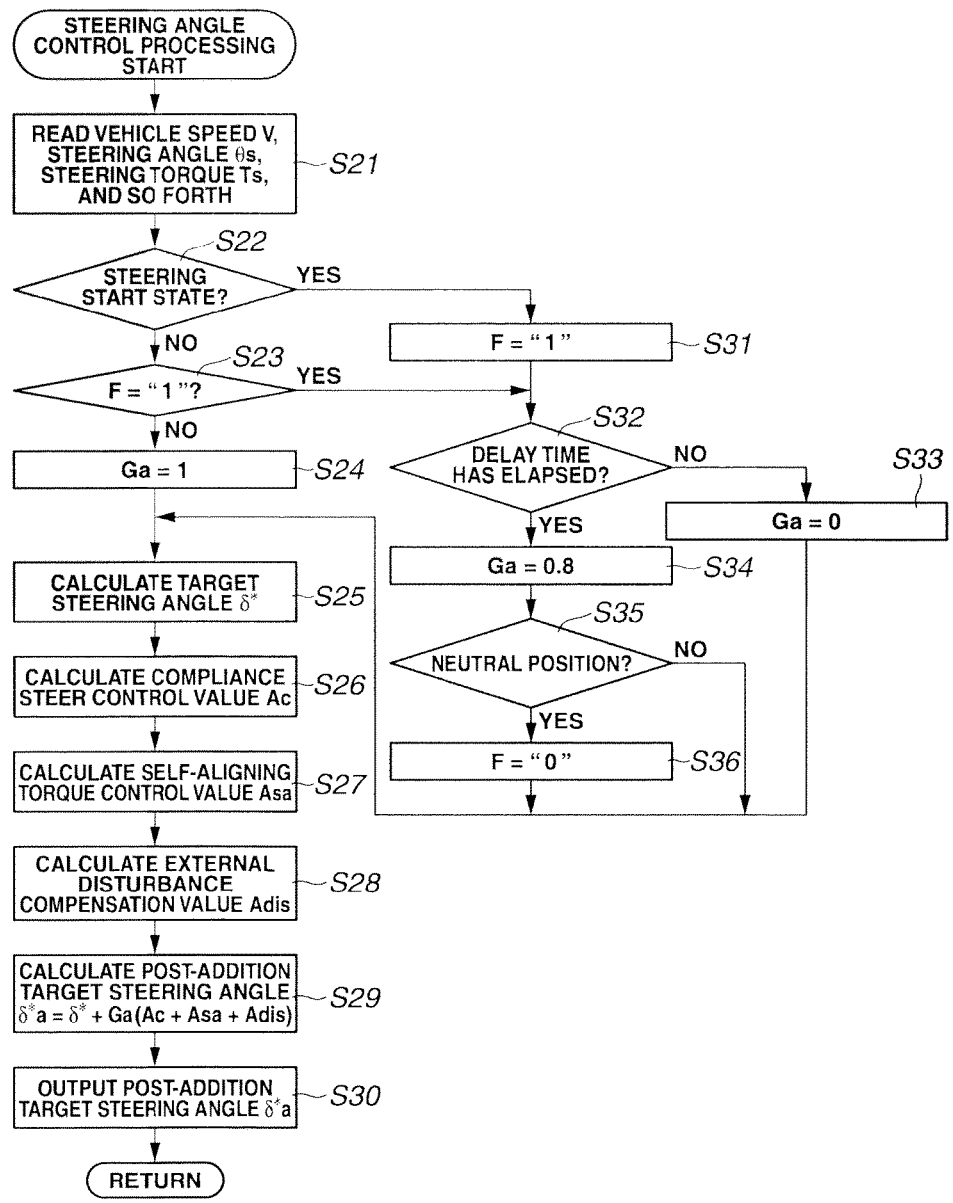
FIG. 30 is a flowchart representing one example of a steering angle control process in the fourth embodiment.

For example, target steering angle calculation section 51 and straightness securing section SG may, for example, be constituted by an arithmetic processing unit such as the microcomputer and so forth and the steering control process shown in FIG. 30 may be executed.

In the steering control process is, as shown in FIG. 30, first at a step S21, the data required for the arithmetic processing such as vehicle speed V, steering angle θs detected by steering angle sensor 4, driving forces TL, TR of driving force control apparatus 71, and steering torque Ts detected by steering torque sensor 5 are read.

Then, the routine goes to a step S22. At step S22, the arithmetic processing unit determines whether the present state is the steering start stage of the rightward turn or leftward steering from the state in which steering wheel 2 is held at the neutral position on a basis of steering angle θs. If not the steering start state, the routine goes to a step S23.

At this step S23, the arithmetic processing unit determines whether control flag F representing that the present state is in the steering start control state is set to "1". If control flag F is reset to "0", the routine goes to a step S24 at which control gain Ga is set to "1" and the routine goes to a step S25. At step S25, the arithmetic processing unit calculates target steering angle δ* on a basis of vehicle speed V and steering angle θs in the same way as target steering angle calculation section 51 described before.

Next, the routine goes to a step S26. At step S26, the arithmetic processing unit multiplies compliance steer coefficient sf by the left-and right driving forces TL and TR of right and left road wheels in the same way as steering angle control section 52 described before to calculate displacements (variation quantities) Δfl and Δfr of steerable wheels 17FL, 17FR due to the compliance steer and calculates compliance steer control value Ac on a basis of these calculation data.

Next, the routine goes to a step S27. At step S27, the arithmetic processing unit refers to a generation torque estimation control map shown in FIG. 23 on a basis of driving force difference ΔT (=TL−TR) between left and right road wheel driving forces TL and TR in the same way as straightness complement section 53 described before to estimate generation torque Th generated at a time of the steering due to the torque steer phenomenon, subtracts this generation torque Th from steering torque Ts to calculate self-aligning torque Tsa, multiplies this self-aligning torque Tsa by predetermined grain Ksa to calculate self-aligning torque control value Asa.

Next, the routine goes to a step S28. At step S28, the arithmetic processing unit calculates external disturbance compensation value Adis on a basis of rotational angle θmo of steering actuator 8, motor current imr detected by motor current detection section 61, and steering torque Ts in the same way as external disturbance compensation section 54 described before.

Next, the routine goes to a step S29. At step S29, the arithmetic processing unit calculates post-addition target steering angle δ*a by adding target steering angle δ* to a value of control gain Ga by which the addition value of compliance steer control value Ac, self-aligning torque control value Asa, and external disturbance compensation value Adis are multiplied in accordance with the following equation (4).

$$\delta^*a = \delta^* + Ga \cdot (Ac + Asa + Adis) \tag{4}$$

Next, the routine goes to a step S30. At step S30, the arithmetic processing unit outputs calculated post-addition target steering angle δ*a to steering angle deviation calculation section 58 in FIG. 29 and the routine returns to step S21.

In addition, at step S22, when the result of determination at step S22 indicates the steering start state, the routine goes to step S31 at which control flag F is set to "1" and the routine goes to a step S32. Furthermore, when the result of determination at step S23 indicates that control flag F is set to "1", the routine goes directly to a step S32.

At step S32, the arithmetic processing unit determines whether the present time is after the predetermined delay time (for example, 0.1 seconds) has elapsed. When the delay time has not elapsed (No) at step S32, the routine goes to a step S33. After control gain Ga is set to "0" at step S33, the routine goes to step S25.

If the result of determination at step S32 indicates that the predetermined delay time has passed, the routine goes from step S32 to a step S34. At step S34, control gain Ga is set to "0.8" and the routine goes to a step S35.

At this step S35, the arithmetic processing unit determines whether steering angle θs detected by steering angle sensor 4 indicates the neutral position of steering wheel 2. If the result of determination indicates that steering wheel 2 is placed at the neutral position at step S35, the routine goes to a step S36 to reset control flag F to "0" and the routine goes to step S25. If No at step S35 (not neutral position), the routine goes directly to step S25.

When, even in the steering control process shown in FIG. 30, the present state is not the steering start state in which the rightward or leftward steering is started from the state in which steering wheel 2 is held at the neutral position, control gain Ga is set to "1". The steering control is carried out on a basis of straightness securing control value δa which is the addition of compliance steer control value Ac, self-aligning torque control value Asa, and external disturbance compensation value Adis to target steering angle δ*a and secures the straightness of suspension unit 1B.

On the other hand, when the present state is the steering start state in which the rightward or leftward steering of steering wheel 2 is started from the state in which steering wheel 2 is held at the neutral position, control gain Ga is set to "0" until the preset delay time is passed. Hence, only target steering angle δ*a is outputted to steering angle deviation calculation section 58. Thus, steering motor 8a constituting steering actuator 8 is rotationally driven. Therefore, since the high steering response characteristic of the suspension unit itself is set to the initial steering response characteristic, the high steering response characteristic can be obtained.

Thereafter, if the delay time has passed, control gain Ga is set to "0.8". Hence, steering motor 8a constituting steering actuator 8 is rotationally driven by means of post-addition target steering angle δ*a (which is the addition of target steering angle δ* to control gain Ga multiplied by the addition of compliance steer control value Ac, self-aligning torque control value Asa, and external disturbance compensation value Adis. Consequently, the high steering response characteristic of the suspension unit according to the straightness securing control by means of steer-by-wire system SBW is suppressed and the ideal steering response characteristic shown by characteristic line L1 of FIG. 25(a) can be obtained.

In such a processing in FIG. 30, the process of step S25 corresponds to target steering angle calculation section 51, the process of step S26 corresponds to steering angle control section 52, the process of step S27 corresponds to straightness complement section 53, and the process of step S28 corresponds to external disturbance compensation section 54. In addition, the processes of steps S24 through S28 and processes of steps S25 through S29 correspond to straightness securing section SG, and the processes of step S22, S23, and S31 through S29 corresponds to delay control section 56, and the processes of steps S21 through S37 correspond to steering response characteristic setting section SRS.

(Modifications of Third and Fourth Preferred Embodiments)

It should be noted that when, in the above-described third and fourth embodiments, the rightward or leftward steering is started from the state in which steering wheel 2 is in the neutral position, the straightness securing control in which straightness securing control value δa is added to target steering angle δ* is stopped. However, the present invention is not limited to the above described matter.

Figure 31:
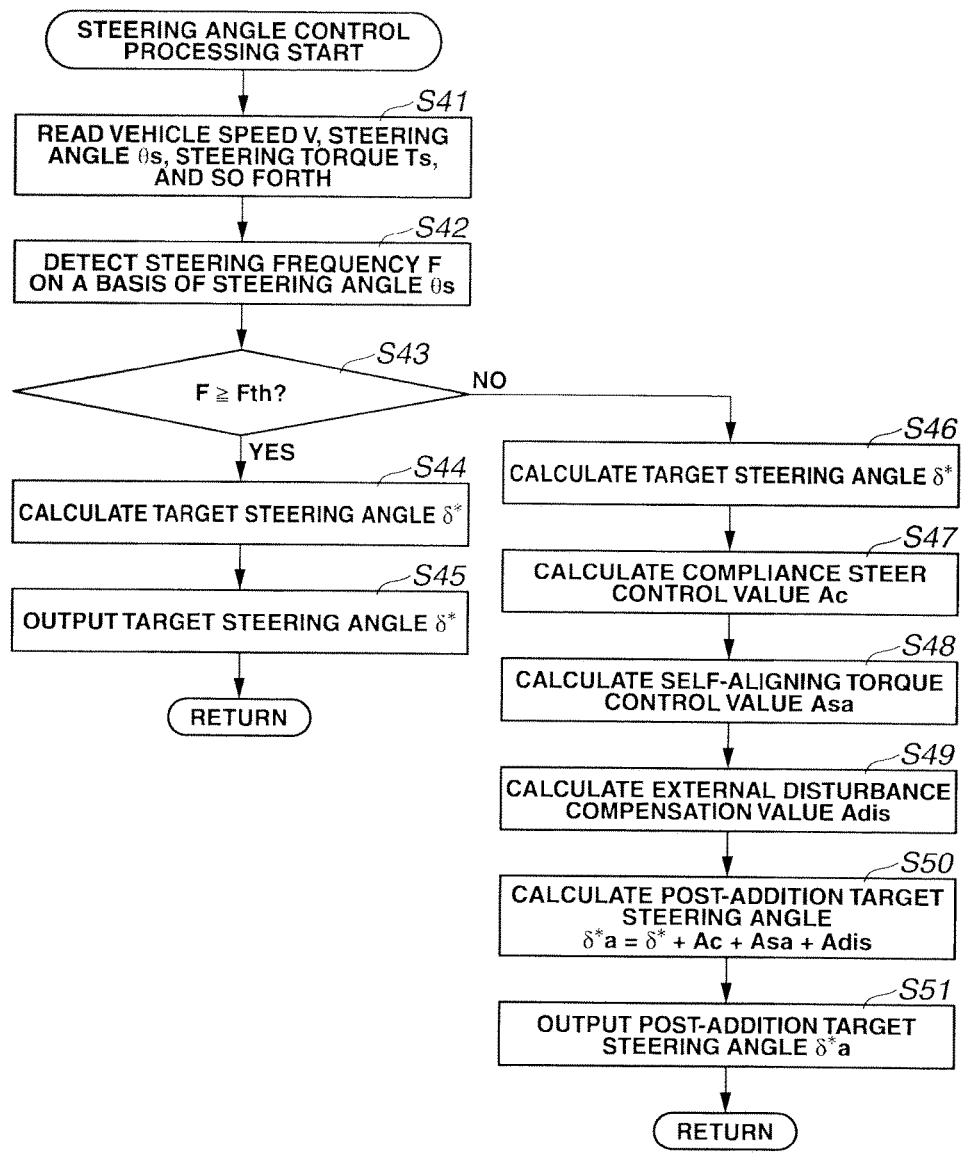
FIG. 31 is a flowchart representing one example of a steering response characteristic adjustment process.

As shown in FIG. 31, such a steering response characteristic adjustment process that the arithmetic processing unit determine whether the straightness securing control in which the straightness securing control value δa is added to target steering angle δ* is carried out in accordance with a steering frequency to adjust the steering response characteristic may be prepared.

The above-described steering response characteristic adjustment process will be described as follows: That is to say, as shown in FIG. 31, at a step S41, the data required for the calculation such as vehicle speed V, steering angle θs, rotational angle θmo, driving forces TL, TR, and so forth are read. Next at a step S42, the arithmetic processing unit detects steering frequency F on a basis of steering angle θs outputted from steering angle sensor 4. At a step S43, the arithmetic processing unit determines whether detected steering frequency F is in excess of a preset frequency threshold value Fth (for example, 2 Hz).

If the result of determination at step S43 indicates that F≥Fth, the arithmetic processing unit determines that the high steering response characteristic is needed and the routine goes to a step S44. At step S44, the arithmetic processing unit calculates target steering angle δ* and the routine goes to a step S45 at which calculated target steering wheel δ* is outputted to steering angle deviation calculation section 58 described before and the routine returns to step S41.

On the other hand, if the result of determination at step S43 indicates that F<Fth (No), the arithmetic processing unit determines that no high steering response characteristic is needed and the steering (the maneuverability and) stability is required and the routine goes to a step S46. At step S46, the arithmetic processing unit calculates target steering angle δ* At step S47, the arithmetic processing unit calculates compliance steer control value Ac, and, at a step S48, the arithmetic processing unit calculates self-aligning torque control value Asc.

Next, the routine goes to a step S49. At step S49, the arithmetic processing unit calculates external disturbance compensation value Adis. At step S50, the arithmetic processing unit adds together calculated target steering angle δ*, compliance steer control value Ac, self-aligning torque control value Asa, and external disturbance compensation value Adis to calculate post-addition target steering angle δ*a and the routine goes to a step S51.

At step S51, the arithmetic processing unit outputs post-addition target steering angle δ*a to steering angle deviation calculation section 58 in FIG. 22 and the routine returns to step S41.

When, in the steering response characteristic processing, steering frequency F to steer steering wheel 2 is at a low frequency lower than frequency threshold value Fth, the determination that the high response characteristic is not needed but the maneuverability (steering) and stability are needed is made. Then, the steering control is carried out using post-addition target steering angle δ*a which is the addition of straightness securing control value δa to target steering angle δ* so that the ideal steering control can be carried out. In addition, in a case where steering frequency F is higher than frequency threshold value Fth, the arithmetic processing unit determines that the high response characteristic is needed and the steering angle control on a basis of the steering response characteristic that suspension unit 1B itself has can be carried out.

In this case, the arithmetic processing unit determines whether target steering angle δ* is to be corrected in accordance with the steering frequency. Hence, an optimum response characteristic in accordance with the steering state can be set.

It should be noted that, In this alternative case, if F<Fth, such a gain as set to a value ranging from 0 to 1 in accordance with the value of steering frequency F is multiplied by straightness securing control value δa so as to enable a modification of a degree of the correction of the straightness. Thus, a finer response characteristic control can be carried out.

Furthermore, the present invention is not limited to be applied to the automotive vehicle but can be applied to other vehicles, each having the steering system.

EXPLANATION OF SIGNS 1 automotive vehicle, 1A vehicle body, 1B suspension unit, 2 steering wheel, 3 input side steering axle, 4 steering angle sensor, 5 steering torque sensor, 6 steering reaction force actuator, 7 steering reaction force actuator angle sensor 8 steering actuator 9 steering actuator angle sensor, 10 output side steering axle, 11 steering torque sensor, 12 pinion gear, 13 pinion angle sensor, 14 rack axle, 15 tie rod, 17FR, 17FL, 17RR, 17RL road wheels, 21 vehicle state parameter obtaining section, 24FR, 24FL, 24RR, 24RL road wheel speed sensors, 26 control/drive circuit unit, 27 mechanical backup, 32 axle, 33 axle carrier, 34 spring member, 37 first link, 38 second link, 40 shock absorber, 41 stabilizer, 50 steering control section, 51 target steering angle calculation section, 52 steering angle control section, 53 straightness compensating section, 54 external disturbance compensation section, 55 adder, 56 delay control section, 56a steering start detection section, 56g selection section, 56h gain adjustment section, 57 adder, 58 steering angle deviation calculation section, 59 steering motor control section, 60 current deviation calculation section, 61 motor current detection section, 62 motor current control section, 63 actuator control apparatus, 81 axle member, 84 lower arm, 86 axle shaft, 90 sub frame, 91 arm attaching section, 101 axle member, 102 strut, 103 shock absorber, 105 lower arm, 108 tie rod, 109 rack axle, 111 straightness compensation section, SS steering mechanism, SM steering mechanism, EP electrically driven power steering apparatus, SW steering wheel, SSi input side steering axle, SSo steering angle sensor, TS steering torque sensor, EA electrically driven steering actuator, RS actuator rotational angle sensor, CT steering control apparatus, PC power steering control section, SG straightness securing section, CP vehicle state parameter obtaining section, PG pinion gear, LS rack axle, TR tie rod, WFR, WFL, WRR, WRL road wheels, WSFR, WSFL, WSFL, WSRL road wheel speed sensors

The invention claimed is:

1. A vehicle comprising:
a steering control apparatus constituted by a steer-by-wire system and that actuates an actuator in accordance with a steered state of a steering wheel to steer steerable wheels, the steerable wheels being mechanically separated from the steering wheel;
a suspension unit including: a wheel hub mechanism supporting a tire wheel on which a corresponding one of the steerable wheels is attached, and link members supporting the wheel hub mechanism on a vehicle body; and
a kingpin axis of the suspension unit which passes through an upper pivot point of the link members of the suspension unit, wherein the steering control apparatus includes: a power steering control section and a straightness securing section, the power steering control section calculating a target auxiliary steering torque on a basis of a steering torque and a vehicle speed, calculating a drive current driving the actuator on a basis of the calculated target auxiliary steering torque, and drivingly controlling the actuator by supplying the drive current to the actuator and the straightness securing section performing a straightness complement control to complement the straightness of the suspension unit which corresponds to a straightness securing control and generating a restoring force for a self-aligning torque on the steerable wheels and wherein the suspension unit is structured such that a positive scrub radius excluding zero is set.

2. The vehicle as claimed in claim 1, wherein the suspension unit is structured such that a zero caster angle is set.

3. A vehicle comprising:
a steering control apparatus constituted by a steer-by-wire system and that actuates an actuator to steer steerable wheels in accordance with a steered state of a steering wheel, the steerable wheels being mechanically separated from the steering wheel; and
a suspension unit including: a wheel hub mechanism supporting a tire wheel on which a corresponding one of the steerable wheels is attached and link members supporting the steerable wheels on a vehicle body,
the suspension unit being disposed to set a kingpin axis of the suspension unit which passes through an upper pivot point of the link members of the suspension unit, a lower pivot point of the link members of the suspension unit, and within a road surface contact area of a tire when the steering wheel is placed at a neutral position,
the steering control apparatus including a power steering control section and a straightness securing section, the power steering control section calculating a target auxiliary steering torque on a basis of a steering torque and a vehicle speed, calculating a drive current driving the actuator on a basis of the calculated target auxiliary steering torque, and drivingly controlling the actuator by supplying the drive current to the actuator and the straightness securing section performing a straightness complement control to complement the straightness of the suspension unit which corresponds to a straightness securing control and calculating a self-aligning torque to secure a straightness of the vehicle and actuating the actuator on a basis of the calculated self-aligning torque to provide a restoring force for the steerable wheels, wherein the suspension unit is structured such that a positive scrub radius excluding zero is set.

4. The vehicle as claimed in claim 3, wherein the suspension unit is structured such that a zero caster angle is set.

5. The vehicle as claimed in claim 3, wherein the restoring force acted upon the tire becomes larger in proportion to a sum of a caster trail and pneumatic trail.

6. The vehicle as claimed in claim 5, wherein the steering control apparatus includes: the straightness securing section configured to secure the straightness of the vehicle; and a steering response characteristic setting section configured to adjust the straightness securing control to set an initial stage steering response characteristic that the suspension unit itself has, when a steering through the steering wheel is started from the neutral position of the steering wheel, wherein the steer-by-wire system detects a displacement of a steering angle when the steering wheel is steered, the actuator steers the steerable wheels on a basis of a result of the detection, and the steering control apparatus controls the actuator.

7. The vehicle as claimed in claim 6, wherein the kingpin axis passes through a surface of the tire between a center of the road surface contact area of the tire within the road surface contact area and a front end of the road surface contact area of the tire.

8. The vehicle as claimed in claim 6, wherein the kingpin axis passes through a proximity of a center of the road surface contact area of the tire within the Mire road surface contact area.

9. The vehicle as claimed in claim 6, wherein the suspension unit is structured such that the caster trail of the kingpin axis is positioned within the road surface contact area of the tire.

10. The vehicle as claimed in claim 6, wherein an intersecting point between the caster trail of the kingpin axis and the road surface is positioned between a center of the road surface contact area of the tire and a front end of the road surface contact area of the tire.

11. The vehicle as claimed in claim 6, wherein the suspension unit is disposed to set a suspension geometry determined by an inclination angle of the kingpin axis and a scrub radius in a positive scrub radius region excluding zero.

12. The vehicle as claimed in claim 6, wherein the straightness securing section calculates a securing purpose command value by multiplying the calculated self-aligning torque by a gain.

13. The vehicle as claimed in claim 6, wherein the steering control apparatus includes a steering angle control section configured to perform a displacement correction of each of the steerable wheels by estimating a compliance steer.

14. The vehicle as claimed in claim 6, wherein the steering control apparatus, when a steering through the steering wheel is started from the neutral position of the steering wheel, sets a high steering response characteristic that the suspension unit itself has in an initial state, and sets a required steering response characteristic according to the straightness securing control by the straightness securing section in a steering state after a passage of the initial stage steering state.

15. The vehicle as claimed in claim 6, wherein the steering response characteristic setting section includes a delay control section configured to delay the straightness securing control by the straightness securing section when the steering wheel is started from the neutral position.

16. The vehicle as claimed in claim 15, wherein the delay control section includes a gain adjustment section configured to adjust a start of the straightness securing control by the straightness securing section.

17. The vehicle as claimed in claim 15, wherein the delay control section starts the straightness securing control after 0.1 second delay from a steering start timing at which a rightward or leftward steering is carried out from a state in which the steering wheel is held at the neutral position.

18. The vehicle as claimed in claim 15, wherein the delay control section starts the straightness securing control in a stepwise manner in a case where the straightness securing control by the straightness securing section is started.

19. The vehicle as claimed in claim 16, wherein the delay control section gradually starts the straightness securing control in a case where the straightness securing control by the straightness securing section is started.

20. The vehicle as claimed in claim 6, wherein the steering control apparatus comprises: a target steering angle calculation section configured to calculate a target steering angle in accordance with a steering angle; an adder configured to add a straightness securing control value of the straightness securing section to the target steering angle calculated by the target steering angle calculation section; a steering motor control section configured to form a motor command current to make an addition output of the adder coincident with a rotational angle of a steering motor constituting the steering actuator; and a current control section configured to form a motor drive current which is coincident with the motor command current and supplied to the steering motor.

* * * * *